United States Patent [19]
Gibeau et al.

[11] Patent Number: 5,920,361
[45] Date of Patent: *Jul. 6, 1999

[54] METHODS AND APPARATUS FOR IMAGE PROJECTION

[75] Inventors: Frank C. Gibeau, Los Altos, Calif.; Roger Frank Bessler, Laurenceville; James Henry Arbeiter, Hopewell, both of N.J.

[73] Assignee: Nitor, San Jose, Calif.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/908,235

[22] Filed: Aug. 7, 1997

Related U.S. Application Data

[63] Continuation of application No. 08/447,252, May 22, 1995, which is a continuation of application No. 08/013,036, Feb. 3, 1993.

[51] Int. Cl.$^6$ .............................. H04N 5/74; H04N 9/31; G02F 1/00
[52] U.S. Cl. ......................... 348/750; 348/756; 353/31; 359/216; 359/217
[58] Field of Search ................................. 348/750, 756, 348/758, 195–205, 759, 760, 761, 762; 359/285, 286, 287, 305, 315, 316, 193; 347/238, 237; 372/20, 21, 22, 26, 13, 75, 72; 353/31; 385/1, 2, 5, 7, 8; H04N 9/31, 5/74, 9/14

[56] References Cited

U.S. PATENT DOCUMENTS

| | | | |
|---|---|---|---|
| 4,040,096 | 8/1977 | Starkweather | 358/302 |
| 4,205,348 | 5/1980 | DeBenedictis et al. | 358/285 |

(List continued on next page.)

FOREIGN PATENT DOCUMENTS

| | | | |
|---|---|---|---|
| 0 374 857 | 6/1990 | European Pat. Off. | H04N 3/08 |
| 0374857 A1 | 6/1990 | European Pat. Off. | H04N 3/08 |

(List continued on next page.)

OTHER PUBLICATIONS

Patent Abstracts of Japan, JP 59–155826, Published Sep. 5, 1994, Hitachi Ltd.
Patent Abstracts of Japan, JP 58–145914, Publised Aug. 31, 1983, Canon Inc.

(List continued on next page.)

Primary Examiner—Michael Lee
Attorney, Agent, or Firm—Limbach & Limbach L.L.P.

[57] ABSTRACT

Method and apparatus for a multi-application, laser-array-based image system utilizes three linear laser arrays. Each linear array generates multiple (N>1) parallel output beamlets at one of the three primary colors (red, green, blue). The corresponding 1 to N output beamlets of the three linear arrays, each individually modulated in luminance according to a specific encoding scheme representing the video image to be produced on the viewing screen, are combined spatially to form a single white light linear array source. Through a projection/scanner optical system, the N output beamlets of the white light source are simultaneously directed to, and swept horizontally across a distant viewing screen, resulting in a swath of N lines of a graphic video image. By producing M contiguous swaths vertically down the viewing screen, a full image of M×N lines is produced. The red, green, and blue linear laser arrays may consist of arrays of semiconductor laser diodes made of suitable semiconductor materials so as to directly emit radiation at wavelengths corresponding to red, green, and blue colors, respectively. Alternatively, the red, green and blue color arrays may be formed by arrays of semiconductor laser diodes emitting radiation at twice the desired red, green and blue wavelengths, whose radiation is coupled to arrays of second harmonic generation crystal elements.

8 Claims, 18 Drawing Sheets

U.S. PATENT DOCUMENTS

| | | | |
|---|---|---|---|
| 4,263,621 | 4/1981 | Berke | 358/213 |
| 4,274,703 | 6/1981 | Fisli | 350/6.8 |
| 4,297,723 | 10/1981 | Whitby | 358/60 |
| 4,306,278 | 12/1981 | Fulton et al. | 362/259 |
| 4,342,906 | 8/1982 | Hyatt | 250/205 |
| 4,345,258 | 8/1982 | Tsai et al. | 346/17 |
| 4,393,387 | 7/1983 | Kitamura | 346/108 |
| 4,474,422 | 10/1984 | Kitamura | 350/6.8 |
| 4,475,200 | 10/1984 | Lee | 372/46 |
| 4,650,280 | 3/1987 | Sedlmayr | 350/96.27 |
| 4,689,482 | 8/1987 | Horikawa et al. | 250/205 |
| 4,690,714 | 9/1987 | Li | 437/208 |
| 4,720,747 | 1/1988 | Crowley | 358/231 |
| 4,796,964 | 1/1989 | Connell et al. | 350/6.8 |
| 4,799,777 | 1/1989 | Edouard et al. | 350/358 |
| 4,805,974 | 2/1989 | Brueggemann et al. | 350/6.7 |
| 4,822,151 | 4/1989 | Tatsuno et al. | 350/401 |
| 4,851,918 | 7/1989 | Crowley | 358/231 |
| 4,870,652 | 9/1989 | Thornton | 372/50 |
| 4,884,857 | 12/1989 | Prakash et al. | 350/6.8 |
| 4,892,371 | 1/1990 | Yamada et al. | 350/6.8 |
| 4,930,849 | 6/1990 | Tanaka | 250/227.26 |
| 4,931,874 | 6/1990 | Grillon et al. | 348/125 |
| 4,934,773 | 6/1990 | Becker | 350/6.6 |
| 4,958,098 | 9/1990 | Sarraf | 310/156 |
| 4,978,202 | 12/1990 | Yang | 348/196 |
| 4,980,700 | 12/1990 | Ng | 346/1.1 |
| 5,032,924 | 7/1991 | Brown et al. | 358/231 |
| 5,051,834 | 9/1991 | Matui et al. | 358/231 |
| 5,107,363 | 4/1992 | Matsui et al. | 359/211 |
| 5,140,427 | 8/1992 | Nakane et al. | 358/231 |
| 5,192,946 | 3/1993 | Thompson et al. | 348/764 |
| 5,255,082 | 10/1993 | Tamada | 358/60 |
| 5,317,348 | 5/1994 | Knize | 348/750 |
| 5,424,771 | 6/1995 | Yu | 348/203 |
| 5,534,950 | 7/1996 | Hargis et al. | 348/758 |
| 5,614,961 | 3/1997 | Gibeau et al. | 348/750 |

FOREIGN PATENT DOCUMENTS

| | | | |
|---|---|---|---|
| 385 706 A2 | 9/1990 | European Pat. Off. | G09F 9/37 |
| 2 577 371 | 2/1985 | France | H04N 5/74 |
| 59-226452 | 12/1984 | Japan | H01J 31/34 |
| 2-039119 | 2/1990 | Japan | G02B 26/10 |
| 2-118511 | 5/1990 | Japan | G02B 26/10 |
| 2-157790 | 6/1990 | Japan | G09F 9/00 |
| 3-068914 | 3/1991 | Japan | G02B 26/10 |
| 2 252 472 | 5/1992 | United Kingdom | H04N 9/31 |
| 2252472 | 8/1992 | United Kingdom | H04N 9/31 |
| WO 85/01175 | 3/1985 | WIPO | H04N 5/74 |

OTHER PUBLICATIONS

A very high resolution virtual display (Benjamin Wells) SPIE vol. 1664 High Resolution Displays and Projection Systems (1992), pp. 134–140 *.

Development of a multibeam recording head with Laser Diodes for Color Scanners (Yutaka Tamura) SPIE vol. 1254 Optical Hard Copy and Printing Systems (1990), pp. 68–73 *.

A study on laser scanning systems using a monolithic arrayed laser diode (Minoura, Suzuki, Miyazawa) SPIE vol. 1079 Hard Copy Output (1980), pp. 462–474 *.

High Resolution LED Printing Heads, (Takasu, Sakaguchi, Niina) SPSE —Advances in Non–Impact Printing Technologies, 1984, pp. 168–171 *.

Text and Image Printing With LED Arrays (Librecht), SPSE—Advances in Non–Impact Printing Technologies, 1984, pp. 170–173 *.

Properties of LED–Arrays for Electrophotographic Applications (Schairer) SPSE–Advances in Non–Impact Printing Technologies, 1984, pp. 173–174 *.

LED Uniformity Compensation (Segel & Warberg) SPSE–Advances in Non–Impact Printing Technologies, 1984, pp. 175–177 *.

180 mega–pixel per second optical image recording (Rosenheck), 378–III–10 reprinted with permission from *Advances in Laser Scanning Technology,* SPIE Proceedings vol. 299, pp. 9–13, Aug. 1981 *.

Non–Impact Printing Technologies (Haas), *Image Processes and Materials,* Chapter 13, pp. 375–405 *.

Generating Multi–Dimensional Scan Using A Single Rotating Component (Hildebrand) 378–III–13 reprinted with permission from *Laser Scanning Components and Technologies,* SPIE Proceedings vol. 84, pp. 85–90, Aug. 1976 *.

Applications of multi–beam acousto–optical modulators in laser–electrophographic printing and drawing machines (S. B.Tokes), pp. 10–15 *.

Multibeam Acoustooptic and Electrooptic Modulators (David L. Hecht), pp. 2–9 Xerox Corporation, Palo Alto, California *.

La Video A Laser, Innovation (French article with translation) *.

Patent Abstracts of Japan vol. 7, No. (P–238) Nov. 22, 1983 & JP, A, 58 145 914 (Canon K.K.) see abstract *.

Patent Abstracts of Japan vol. 9, No. 6 (P–326) Jan. 11, 1985 & JP, A, 59 155 826 (Hitachi Seisakusho K.K.) see abstracts *.

Patent Abstracts of Japan vol. 8, No. 82 (P–268) Apr. 14, 1984 & JP, A, 58 224 325 (Fujitsu K.K.) see abstract *.

STANDARD CRT RASTER SCAN

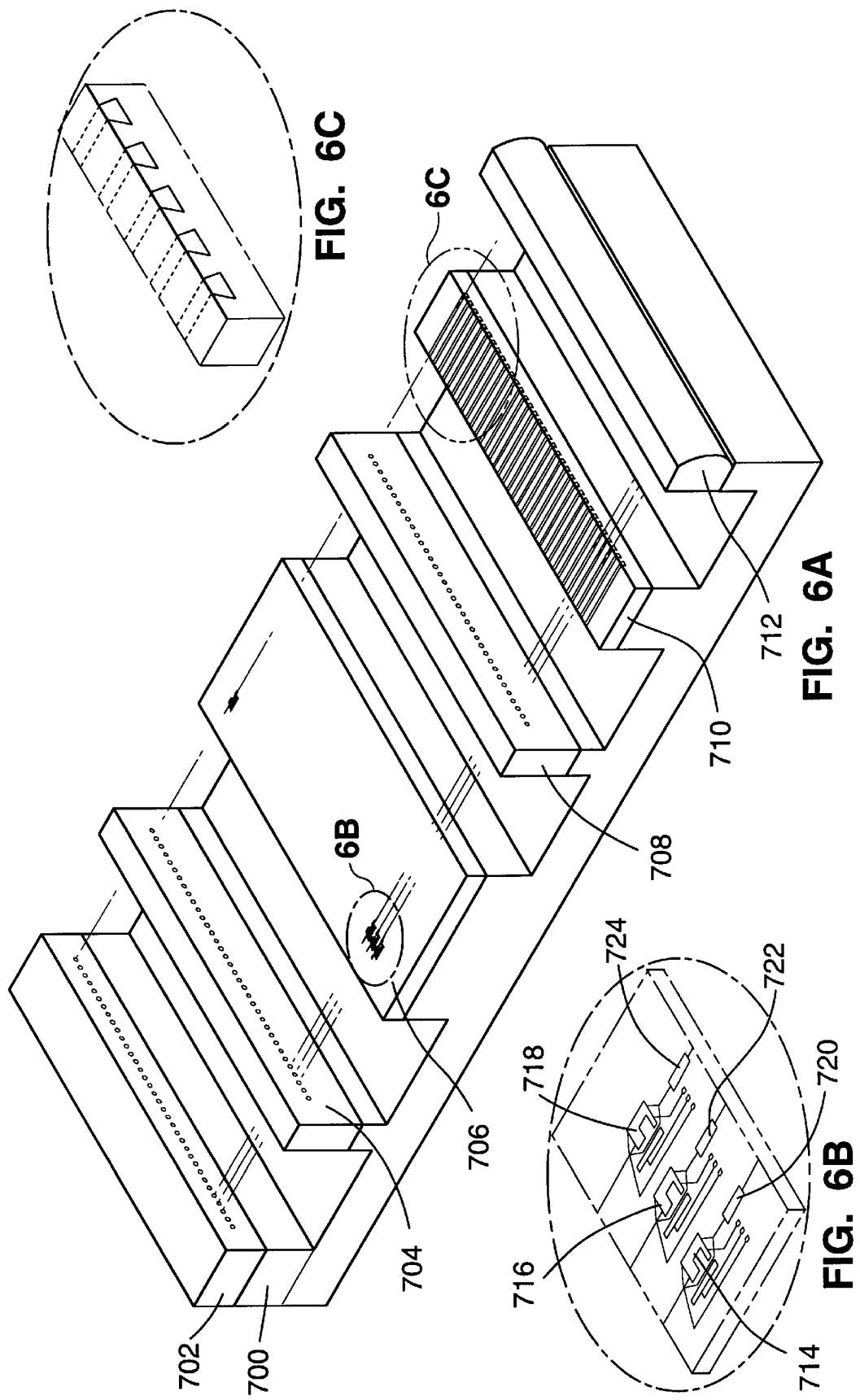

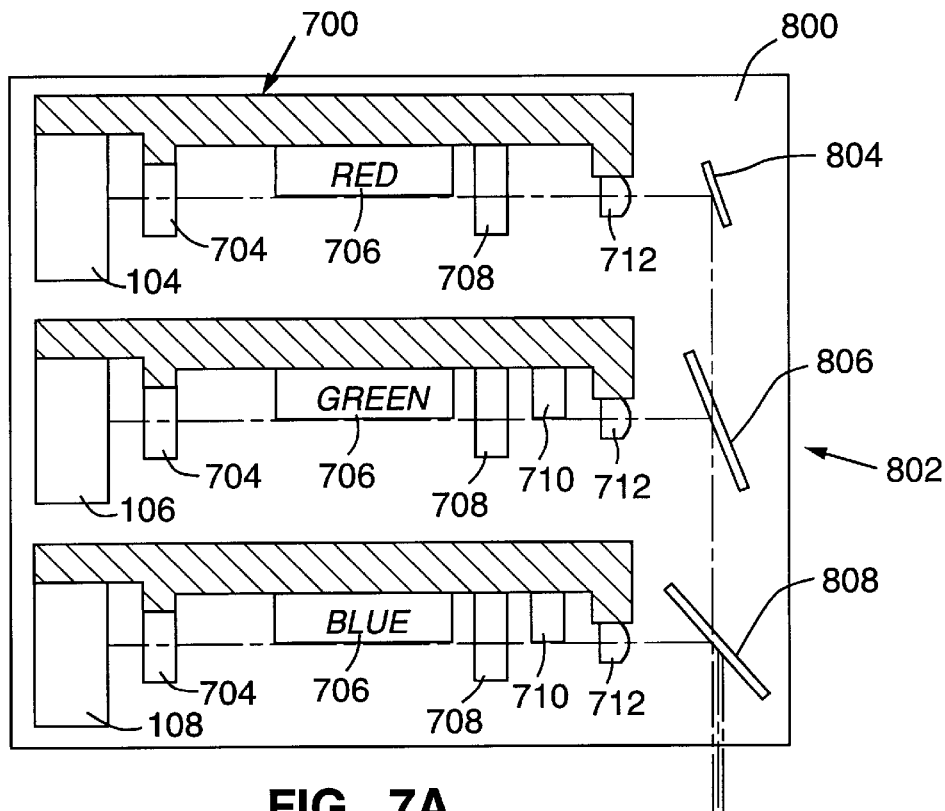
FIG. 7A
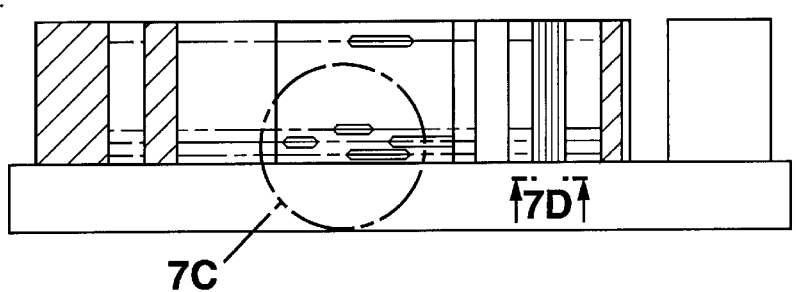
FIG. 7B
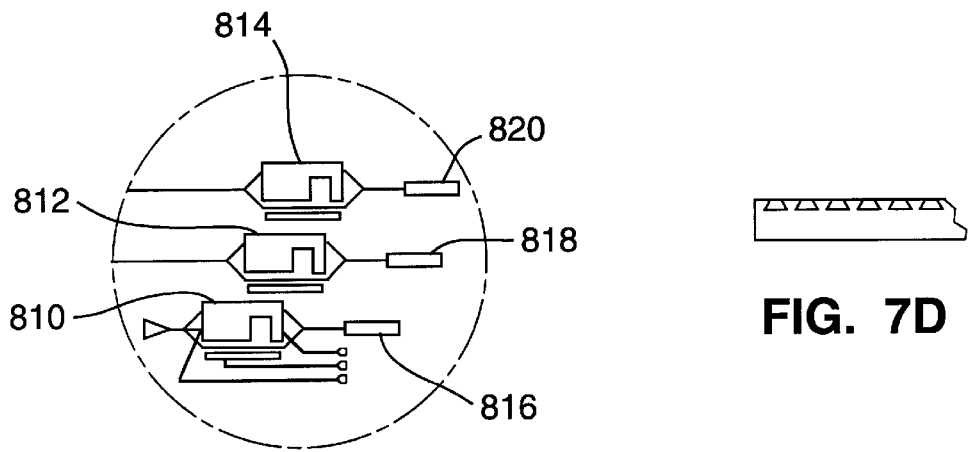
FIG. 7C
FIG. 7D

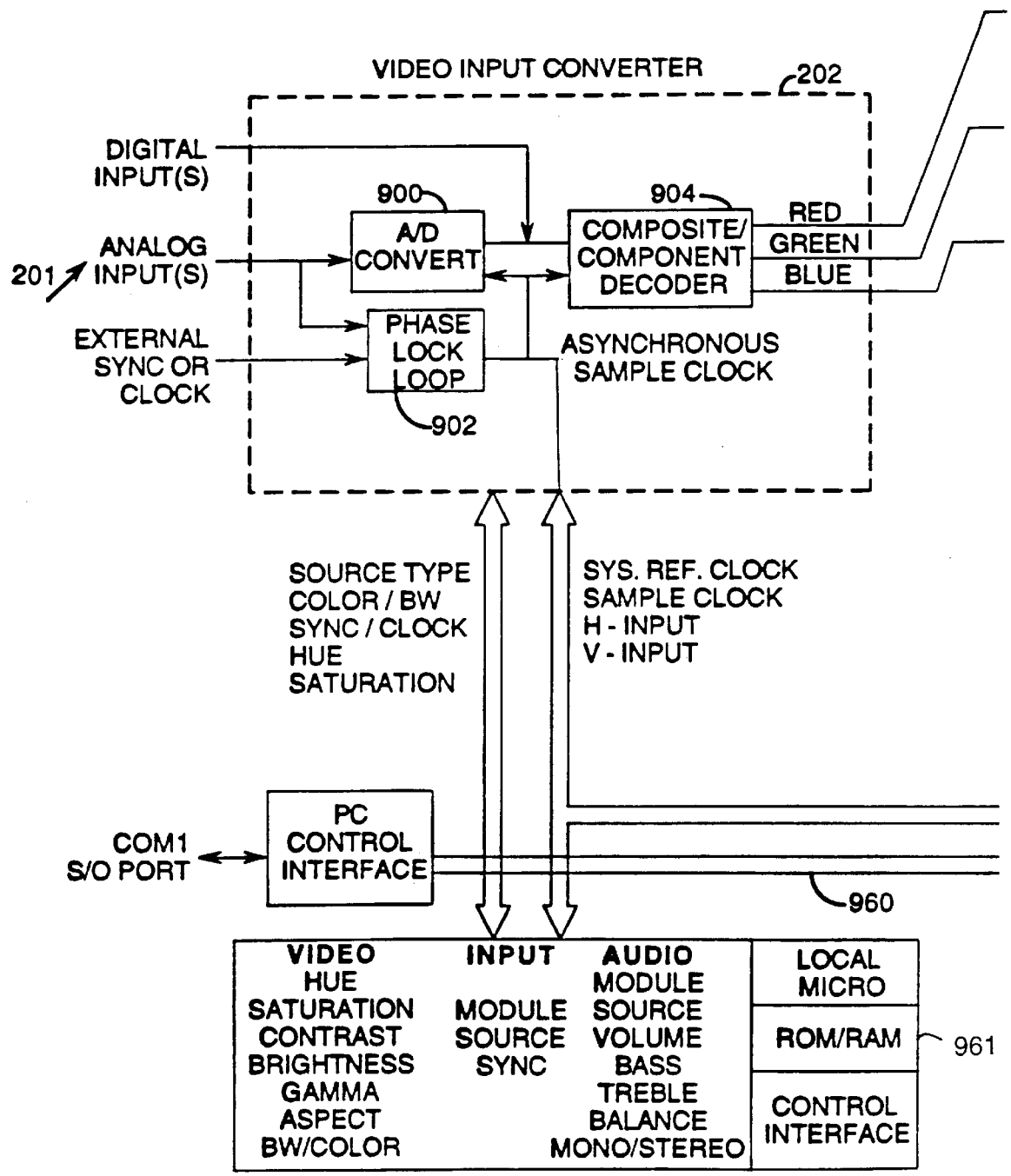
FIG. 8A   TO FIGURE 8B →

← FROM FIGURE 8C

| HDTV: SMPTE 240M (1125) | |
|---|---|
| ASPECT RATIO | 16:9 |
| RASTER LINES | 1125 |
| FRAMES/SECOND | 30 |
| INTERLACE | 2:1 |
| FIELDS/SECOND | 60 |
| HORIZ. LINE FREQ. (HZ) | 33,750 |
| HORIZ. LINE TIME (µSEC) | 29.6296 |
| HORIZ. ACTIVE TIME (µSEC) | 25.8586 |
| VERT. ACTIVE LINES | 1080 |
| SAMPLING FREQ. (MHZ) | 74.25 |
| TOTAL PIXELS/LINE | 2,200 |
| ACTIVE PIXELS/LINE | 1,920 |
| PIXEL TIME (nSEC) | 13.468 |

| IMAGE PROJECTION SYSTEM | |
|---|---|
| ASPECT RATIO | 16:9 |
| PIXELS (MAX) | 1920 X 1035 |
| INTERLACE | 2:1 |
| FIELDS/SECOND | 60 |

FIG. 10A

| HDTV: 1050 NBC Proposed (NTSC Compatible) | |
|---|---|
| ASPECT RATIO | 16:9 |
| RASTER LINES | 1050 |
| FRAMES/SECOND | 29.97 |
| INTERLACE | 2:1 |
| FIELDS/SECOND | 59.94 |
| HORIZ. LINE FREQ. (HZ) | 31,468.53 |
| HORIZ. LINE TIME (μSEC) | 31.778 |
| HORIZ. ACTIVE TIME (μSEC) | 26.444 |
| VERT. ACTIVE LINES | 968 |
| SAMPLING FREQ. (MHZ) | 47.2 |
| TOTAL PIXELS/LINE | 1500 |
| ACTIVE PIXELS/LINE | 1248 |
| PIXEL TIME (nSEC) | 21.18 |

IMAGE PROJECTION SYSTEM

| | |
|---|---|
| ASPECT RATIO | 16:9 |
| PIXELS (MAX) | 1050 X 968 |
| INTERLACE | 2:1 |
| FIELDS/SECOND | 59.94 |

FIG. 10B

| NTSC: RS-170A | |
|---|---|
| ASPECT RATIO | 4:3 |
| RASTER LINES | 525 |
| FRAMES/SECOND | 29.97 |
| INTERLACE | 2:1 |
| FIELDS/SECOND | 59.94 |
| HORIZ. LINE FREQ. (HZ) | 15,734.26 |
| HORIZ. LINE TIME (μSEC) | 63.556 |
| HORIZ. ACTIVE TIME (μSEC) | 52.5 |
| VERT. ACTIVE LINES | 484 |
| SUBCARRIER FREQ. (MHZ) | 3.579955 |
| SAMPLING FREQ. (MHZ) | 14.318 |
| TOTAL PIXELS/LINE | 910 |
| ACTIVE PIXELS/LINE | 768 |
| PIXEL TIME (nSEC) | 69.841 |

| IMAGE PROJECTION SYSTEM | |
|---|---|
| ASPECT RATIO | 4:3 |
| PIXELS (MAX) | 525 X 484 |
| INTERLACE | 2:1 |
| FIELDS/SECOND | 59.94 |

FIG. 10C

| VGA (Monochrome / Color) | |
|---|---|
| ASPECT RATIO | 4:3 |
| RASTER LINES | 480 |
| INTERLACE | 1:1 |
| FIELDS/SECOND | 50-70 |
| HORIZ. LINE FREQ. (HZ) | 31.5 |
| HORIZ. LINE TIME (μSEC) | 37.778 |
| HORIZ. ACTIVE TIME (μSEC) | 26.058 |
| VERT. ACTIVE LINES | 350, 400, 480, 600 |
| SAMPLING FREQ. 1 (MHz) | 25.175 |
| SAMPLING FREQ. 2 (MHz) | 28.322 |
| SAMPLING FREQ. 3 (MHz) | 32.514 |
| SAMPLING FREQ. 4 (MHz) | 40.000 |
| ACTIVE PIXELS/LINE | min. 320, max. 800 |

| IMAGE PROJECTION SYSTEM | |
|---|---|
| ASPECT RATIO | 4:3 |
| PIXELS (MAX) | 480 X 800 |
| INTERLACE | 1:1 |
| FIELDS/SECOND | 50 TO 70 |

FIG. 10D

PULSE WIDTH MODULATION FOR 128 GREY LEVELS

METHODS AND APPARATUS FOR IMAGE PROJECTION

This is a continuation of co-pending application Ser. No. 08/447,252 filed on May 22, 1995, which is a Rule 60 continuing application of application Ser. No. 08/013,036, filed Feb. 3, 1993.

BACKGROUND OF THE INVENTION

This invention relates generally to a high resolution, image projection system employing at least one linear array of laser sources, suitable for displaying raster scanned monochrome, two color and full color images such as television video or computer generated text and graphics by projection onto a screen.

Conventional cathode ray tube (CRT) display devices become impractical for large screen sizes. The largest CRT consumer TV display generally does not exceed 40 inches measured diagonally across the screen.

For graphics image display, the ability of the CRT within a monitor to produce a proportional number of pixels for a unit screen area decreases as the tube size gets larger. This limits the ability of larger CRTs to produce the fine detail needed in graphics displays viewed at close distances. This occurs because of the difficulty in accurately reproducing the super fine red, green, and blue (RGB) phosphor trios or stripes over a larger face area without error during the manufacturing process. Furthermore, errors introduced in the deflection of the electron beam are magnified by the distances associated with the larger tube and cause spatial distortion of the pixel information on the screen.

In contrast to graphics displays, consumer TV displays must be bright and have high contrast. Since consumer TV displays are viewed at much greater distances than graphics displays, resolution is not an overriding factor. Additionally, CRTs generate low frequency electromagnetic fields and X-rays. Methods that are used to achieve high brightness cause the electron beam spot size to increase dramatically. As a consequence, this larger spot size causes a large reduction in image sharpness, that in turn reduces contrast and results in soft looking images. Additionally, larger TV screens require a larger deflection angle to prevent the CRT from becoming excessively long. Large deflection angles (over 90 degrees), coupled with large screen size, cause noticeable errors in linearity and color purity. Modern television CRTs were never intended to be large. The size, weight, and power trade-offs do not scale economically for large CRT systems.

As a result, video projectors using superposition of three CRT light sources for the primary colors of white light, namely red, green, blue (RGB), are commonly used. A standard product configuration uses three small diameter primary color CRTs and lenses to converge three separate colors at a screen image. Larger projection screen sizes, than those obtainable using a CRT, can be obtained using this method; however, the brightness and contrast are poor compared to that of a CRT used for home TV video viewing.

Another approach uses a single incandescent white light source to generate the primary colors that illuminate a LCD panel(s). The RGB pixels are independently modulated by the liquid crystal display ("LCD") selection matrices, that also generate the rastering. Although these projectors have fair resolution, there are other unavoidable problems related to this scheme. The incandescent white light source has a relatively short operating life and generates relatively large amounts of heat. The LCD devices cannot be manufactured without some minimum number of defects that, in turn, manifest themselves as permanent image artifacts on the screen regardless of the graphic or video source. Using LCD devices to generate the raster introduces a fixed and permanent resolution to the display device, making it very difficult to adapt the electronics to accept other resolutions for display of graphics and text information.

Brighter video projectors have been constructed using lasers. Typically, the green and blue beams are generated by argon ion gas lasers that directly emit green and blue radiation; the red beam is usually generated by a liquid dye laser (pumped with part of the high power blue and green gas lasers). Generally, each of the three light beams is independently modulated to produce the same luminance and chrominance represented by an input video signal. The three modulated beams are then combined spatially by optical means to produce a single so-called "white light" beam and directed toward the viewing screen by an appropriate raster/scanner optical system. Since only a single white light beam is projected toward the viewing screen in present gas-laser-based projection systems, they are of the N=1 type, the number N specifying the number of white light beams. In such systems, generally, a full color picture (or frame) is produced at the viewing screen by projecting a series of pixels using a combination of rotating and deflection mirrors. With proper synchronization, the rotating mirror scans the white light beam horizontally across the screen, sequentially painting a row of pixels; the deflection mirror simultaneously moves the white light beam vertically down the screen, filling out the picture frame one line of pixels at a time. At any given instant, the white light beam illuminates a given pixel in the frame with the appropriate luminance and chrominance.

Present laser-based N=1 video projector systems are generally capable of producing a brighter image than non-laser based systems, and they can achieve close to 100% color saturation. They also exhibit pixel size stability, since the pixel size is independent of white light beam power. In order to produce a reasonably bright image on a screen larger than 40 inches, the white light beam power at the screen should be in excess of three watts. Gas lasers used in present N=1 projection systems have power efficiencies typically <0.1 percent; accordingly, present day gas-laser-based projection systems require several kilowatts of conditioned electrical power and conditioned cooling water sufficient to remove several kilowatts of waste heat. Such systems are therefore relatively big, lack easy portability and are expensive. In present N=1 laser-based systems, three separate acousto-optic (AO) light modulators are used to impress video modulation information on each of the three RGB beams that forms the single white light output beam. These modulators are problematic and costly. At the power levels needed for bright large-screen displays, modulation nonlinearities and other undesirable effects can degrade picture quality.

Associated with conventional laser-based video projectors has been the need to use high speed components, both mechanical for scanning and electronic for modulation in order to produce a standard television picture. Current NTSC television pictures are reproduced at the rate of $\frac{1}{30}$th of a second per frame, with each frame being filled by 525 horizontal scan lines. In a laser video projector, a multi-facet right polygon mirror is typically used for scanning the single white light laser beam across a screen. Even a 48-facet mirror would require an angular velocity in the region of 50,000 rpm. Bearings capable of such performance are very expensive. The scanning problem becomes even more critical when dealing with High Definition Television (HDTV)

or high resolution graphics, since the pixel density increases, thereby requiring an even higher angular velocity of the polygon mirror.

Various video standards, such as NTSC, and variations of HDTV and computer standards already exist, and new standards will in time be proposed. Among other considerations, these video standards may differ in resolution, picture aspect ratio, frame rate, and interlacing method. Therefore, it would be desirable to have an image projector capable of, or easily adapted to, displaying video pictures conforming to various existing or future video standards.

Thus, there is a tremendous need for a bright, low cost compact video and graphic image projector capable of displaying multiple resolutions of video pictures such as NTSC, HDTV, and high resolution graphics pictures. Furthermore, since the requirements for display of graphics and TV video are different, it would be very desirable to combine the display function of both types of images into a single portable projection unit.

SUMMARY OF THE INVENTION

Accordingly, it is an object of the present invention to provide an improved method and apparatus for video and graphic image projection, capable of reproducing various video standards such as NTSC, HDTV, computer graphics, and other high resolution video pictures.

It is another object of the present invention to provide a low cost method and apparatus for monochrome, two color and full color image projection that is amenable to mass production.

It is yet another object of the present invention to provide a method and apparatus for image projection that is power efficient and compact.

It is a further object of the present invention to provide a laser white light source array that is amenable to mass production.

It is additional object of the present invention to provide a method and apparatus for image projection that uses an optical scanner with relatively slow rotational speeds.

It is another object of the present invention to provide a method and apparatus for image projection system that uses pulse width modulation to generate a high contrast video image.

These and additional objects are accomplished by an improved image projection system comprising three major subsystems: 1) a laser-based linear-array white light source; 2) a system for formatting an input video picture data suitable for digital two-dimensional processing; and 3) an optical scanning/projection system for directing multiple beams of a white light linear array source onto a distant viewing screen.

According to one aspect of the invention, a plurality (N>1) of parallel output beamlets of a laser-based linear array single color, two color or full color (also referred to herein as "white light") source are scanned horizontally across the screen by means of a rotating polygon mirror, illuminating the screen in a swath of N lines. An image resizing processor reformats input picture data into a form suitable for driving RGB linear laser arrays that comprise the white light source. As part of the formatting process, the image resizing processor converts the input picture data into video frames. The optical scanning/projection system directs the N parallel output beamlets from the white light array source onto the screen to recreate the input picture or image by filling the screen with illuminated pixels swath-by-swath, and frame-by-frame. The entire image projection system is controlled by a system control microprocessor which receives input from a video input converter and from either a local control panel or an external computer.

According to another aspect of the invention, the laser-based white light source is produced by spatially combining corresponding N parallel output beamlets of three primary color linear arrays, each of which provides N parallel output beamlets at the red, green, and blue wavelengths.

In one embodiment, the three primary color linear arrays and combining optics, including dichroic mirrors, are mounted on a common base plate. The primary color red, green and blue beams are produced by several different methods, and the respective N output beamlets are modulated by several different methods in several different information formats.

In another embodiment, each primary color linear array incorporates a linear array of N individually-addressable semiconductor stripe laser diodes grown with a semiconductor material whose composition results in laser diode emission at the desired red, green and blue wavelengths. The light intensity of each of the N parallel-directed output beamlets is modulated by directly modulating the drive current supplied to each of the semiconductor stripe laser diodes. The N parallel-directed, modulated output beamlets of each primary color array are collimated by N corresponding micro-optic lenses contained in a linear lens array that is mounted monolithically with its respective primary color laser diode array.

In yet another embodiment, modulation is imposed on each of the N parallel-directed output beamlets of each of the primary color arrays by passing the beamlets through a corresponding optical coupling lens and a corresponding solid state electro-optic modulator. The coupling lenses and the solid state modulators are contained in linear arrays mounted monolithically with the semiconductor laser diode array and output collimating lens array.

In another embodiment, each primary color linear array consists of a linear array of N individually-addressable semiconductor stripe laser diodes emitting parallel beamlets at an infrared wavelength equal to twice the desired red, green, or blue wavelength. The infrared output of each such array is converted to an array of red, green, or blue output beamlets by passing each beamlet through a corresponding optical coupling lens and stripe waveguide made of an appropriate nonlinear crystalline material. The N coupling lenses and nonlinear waveguides are contained in a linear lens array and waveguide array, respectively, mounted monolithically with the semiconductor laser diode array and output collimating lens array. Image information modulates the N parallel-directed output beamlets of each primary color array, either by directly modulating the drive current of the individual semiconductor stripe laser diodes in the array, or by incorporating an array of solid state electro-optical modulators following the nonlinear waveguide array and prior to the output collimating lens array. In the alternative, a red beamlet may be directly generated by use of a suitable semiconductor material without the need for a nonlinear crystalline material harmonic generator.

According to another aspect of the invention, the video information impressed on the N beamlets of each of the three primary color arrays may take several different forms.

In one embodiment, the modulation is implemented by modulating the drive current of the individually addressable semiconductor stripe laser diodes. This differs from acoustooptic modulation utilized in conventional (N=1) laser projector systems because semiconductor laser diodes can be abruptly turned on and off at high rates. In the present invention, pulse width modulation ("PWM") is used without the requirement of prohibitive high-speed/high bandwidth electronics since the simultaneous scanning of N lines of the video image greatly increases the time available to scan a given swath across the screen at a given frame rate. Since N lines are processed in parallel, the data processing rate is reduced by the factor N. For example, a PWM method for $2^7=128$ grey levels may require an increase of data processing rate by a factor of 128. This increase can be offset if N=128 lines are scanned in parallel, since the time to process each pixel is then reduced by a corresponding factor of N=128.

According to another aspect of the invention, the optical scanning/projection system comprises a rotating polygon mirror with progressively tilted facets (hereinafter also referred to as an "irregular polygon mirror") to scan the white light array output horizontally across the screen, to also raster the swath scan vertically down the screen. The rotating polygon has at least as many facets, M, as the number of swaths required to fill the picture frame. Starting from a first facet, a first swath is "painted" across the top of the picture frame. Each successive facet is progressively tilted so as to paint each successive swath directly below the preceding one and contiguous with it, until the picture frame is filled, whereupon the first facet once again begins to paint a swath at the top of the next frame. Since a complete frame is painted using a tilted facet polygon mirror, no galvanometer is required to raster each successive swath vertically down the screen.

In another embodiment, the rotating polygon scan mirror has M facets whose normals maintain a constant angle relative to the mirror spin axis (hereinafter also referred to as a "regular polygon mirror"). To raster each successive swath vertically down the screen, a galvanometer is placed between the rotating polygon scan mirror and the laser array.

An important feature of the present invention is the simultaneous parallel scanning of N pixel lines. As mentioned in connection with PWM above, this parallel processing feature scales down the required speed of associated electronics. A similar mechanical advantage is also gained for the optical scanning/projection system.

In the present invention, each polygon mirror facet is employed to scan a swath of N lines instead of a single line. For a given fixed frame time, the angular velocity (also referred to herein as "rotational speed") of the swath scan polygon mirror is reduced by a factor of N compared to that required for a single line scan polygon mirror. For example, if a swath of 128 lines is scanned, a 10-facet polygon mirror is required to scan and raster a picture frame of 1280 horizontal lines. By comparison, if only one line is scanned at a time (N=1, as in conventional laser projectors) a 10 facet polygon mirror turning at an angular velocity 128 times higher will be required.

In one embodiment, an interlace galvanometer is optionally employed in tandem with the rotating polygon mirror having progressively angled facets (an irregular polygon mirror). This rotating polygon mirror by itself will only produce a progressive (swath sequential) scan for each picture frame. In order to support interlaced video standards, an additional deflection offset is required on alternating fields and is performed by the interlace galvanometer. The interlace galvanometer performs a minor shift to offset successive fields. For example, in a 2:1 interlace, the shift amounts to half a horizontal line spacing for the entire stream. A picture frame is then formed by interlacing two partial frames of "fields", where a field rate is twice that of the frame rate.

In yet another embodiment, an interlace galvanometer is used together with the combination of a regular polygon mirror and a galvanometer which rasters each successive swath vertically down the screen.

According to another aspect of the invention, by increasing the number of N parallel-directed output beamlets to the desired number of raster lines, the rotating polygon mirror and interlace galvanometer can be eliminated, thereby reducing noise vibration, heat and projection errors attributable to the rotating mirror, its associated motor and driving electronics. In this embodiment a single mirror having a height at least equal to the height of N lines is used to provide horizontal deflection. If desired, interlacing may be provided with a separate interlace galvanometer.

According to another aspect of the invention, a data processing system comprises an image resizing processor and a frame storage unit. The image resizing processor transforms input picture data from various types of video standards to a format suitable for the image projection system of the invention. Essentially, the image projection system is designed with a preselected resolution. The image resizing processor maps a picture of a given video standard into the preselected resolution of the image projection system (e.g., represents the picture by the constant number of pixels of the laser projection system). The image resizing processor maps a picture from a lower resolution video standard to that of a high resolution video standard.

The electronic remapping of pictures from various video standards into a preselected resolution system is an important feature of the present invention. Such remapping is implemented with a hardware accelerator using interpolation. Digital methods are superior to conventional optical methods, and greatly simplify the electronics of the image projection system for displaying pictures from the various video standards having different resolutions, aspect ratios, and frame rates.

For example, the preferred embodiment of the present invention has a resolution defined by 1280×1280 pixels within a frame having a screen aspect ratio of 16:9. Pictures from many video standards can be displayed at that resolution. Thus, a HDTV picture will have the same screen aspect ratio, and the image resizing module will essentially map the digitized input video source picture into the 1280×1280 pixels of the laser projection system.

When an NTSC picture is remapped, since the picture has a screen aspect ratio of 4:3 (12/9), the active display picture will fall within a central band flanked by left and right margins. The pixels in the left and right margins (each occupying one-sixth of the horizontal dimension) will not be utilized. Thus, the picture is mapped by the image resizing processor onto the pixels (960×1280) in the central band.

Video standards with different vertical scan rates of frame rates are easily accommodated by varying the angular velocity (rotational speed) of the polygon mirror. Accordingly, increasing the angular velocity of the polygon mirror speeds up the field and frame rates.

The invention provides an image projection system that is power efficient, has high performance, is amenable to low-unit-cost mass-manufacturing processes, and is compatible with multiple video standards.

Additional objects, features, and advantages of the present invention will be understood from the following description of the preferred embodiments, a description which should be referenced in conjunction with the accompanying drawing.

BRIEF DESCRIPTION OF THE DRAWING

FIG. 6A is a perspective view of a primary-color linear laser array source of the present invention;

FIG. 6B is an enlarged view of the area of FIG. 6A indicated by line 6B—6B.

FIG. 6C is an enlarged view of the area of FIG. 6A indicated by the line 6C—6C.

FIGS. 7A–7D illustrates a top plan view of an embodiment of the white light laser array source of FIG. 1;

FIGS. 8A through 8D are a diagram of an image projection system of the present invention detailing the data processing system of FIG. 1.

FIG. 10A specifies parameters for the display of the HDTV: SMPTE 240 m (1125) standard.

FIG. 10B specifies parameters for the display of the proposed HDTV: 1050 NBC standard.

FIG. 10C specifies parameters for the display of the NTSC: RS-170A standard.

FIG. 10D specifies parameters for the display of the VGA (Monochrome/Color) standard.

DETAILED DESCRIPTION OF THE INVENTION

Figure 1:
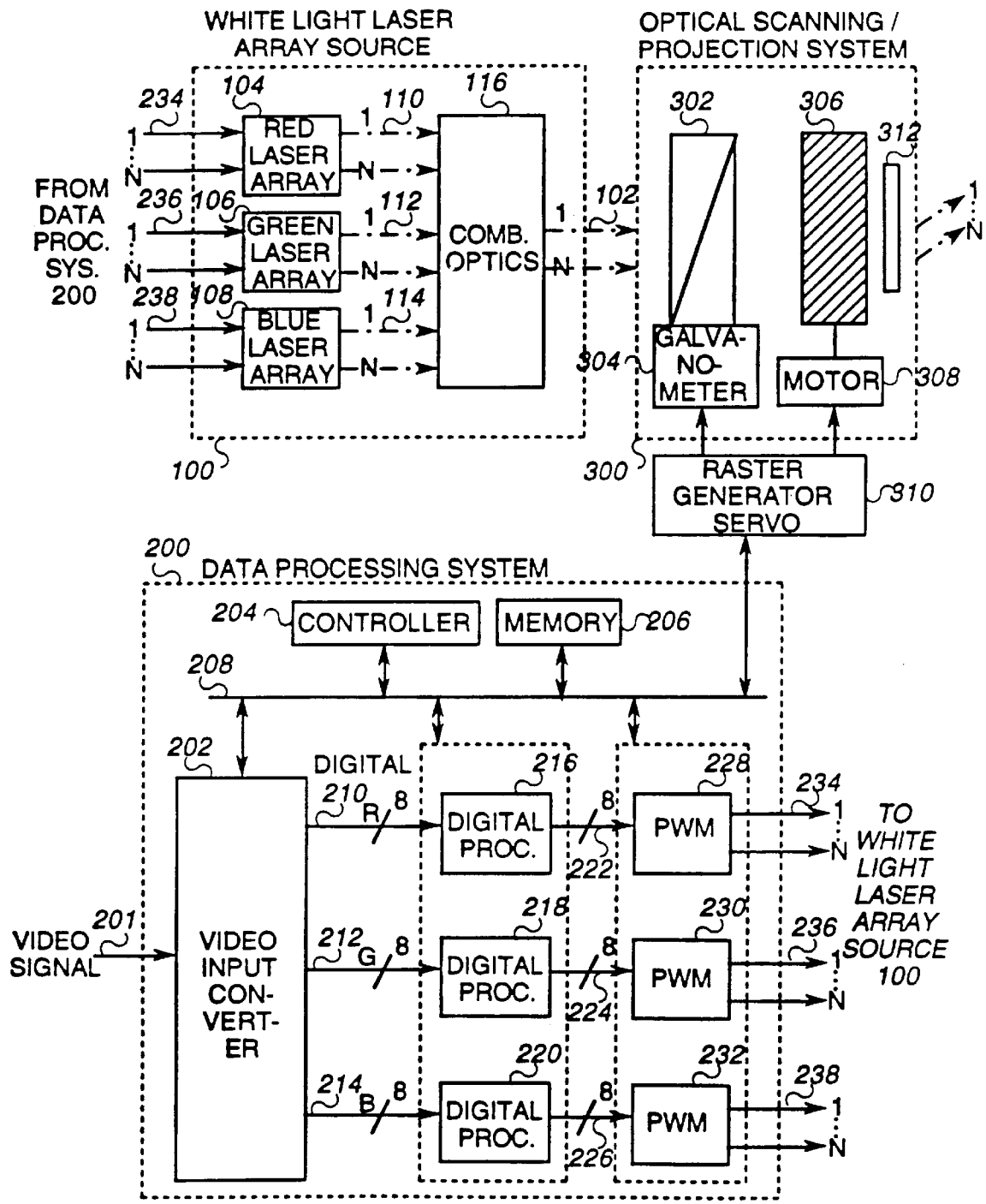
FIG. 1 is a block diagram illustrating the color image projection system of the present invention.

Referring to FIG. 1 a color image projection system 10 is shown. The color image projection system 10 includes a white light linear array source 100, a data processing system 200 for formatting input picture or image data into a suitable form to modulate the white light linear laser array source 100, and an optical scanning/projection system 300 for scanning and projecting the output beams of the white light linear laser array source 100 onto a projection screen 400. The output beams of the white light linear laser array source 100 may also be projected onto or into other photoreceptors such as an eye, paper, photosensitive film or other photosensitive materials.

The white light linear laser array source 100 produces a plurality N of white light parallel-traveling beamlets 102. Each of the separate beamlets is formed by spatially combining the N parallel-traveling output beamlets of each of three primary color linear array sources, a red linear array 104, a green linear array 106, and a blue linear array 108. Each of the parallel-traveling linear array outputs of single color N beamlets 110, 112 and 114 of the three primary color linear array sources 104, 106 and 108, respectively, is then combined by combining optics 116, element-by-element, into a linear array of N parallel-traveling white light beamlets 102. The term "white light beamlet" includes not only a white light appearance in its literal sense, but also includes colors produced by varying combinations of red, green and blue light intensified. The number of beamlets N is between 2 and any integer power of 2 (inclusive).

Figure 2A:
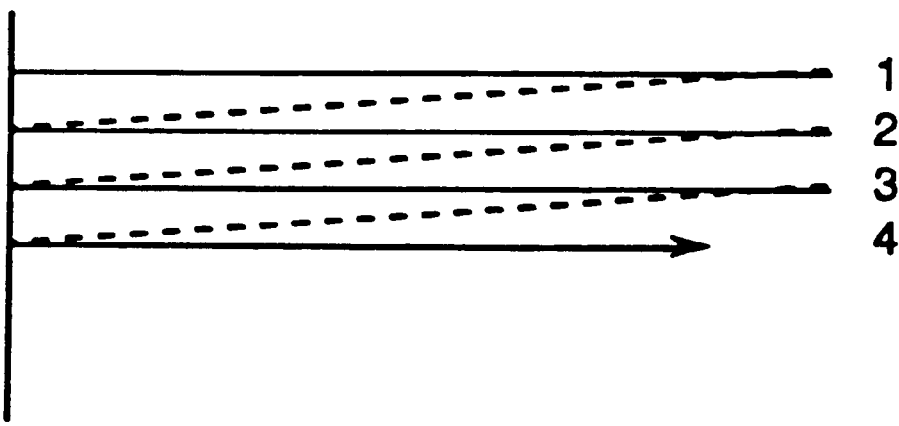
FIG. 2A illustrates the line-by-line raster scan of a conventional single beam (N=1) imaging system, such as that of a CRT.
Figure 2B:
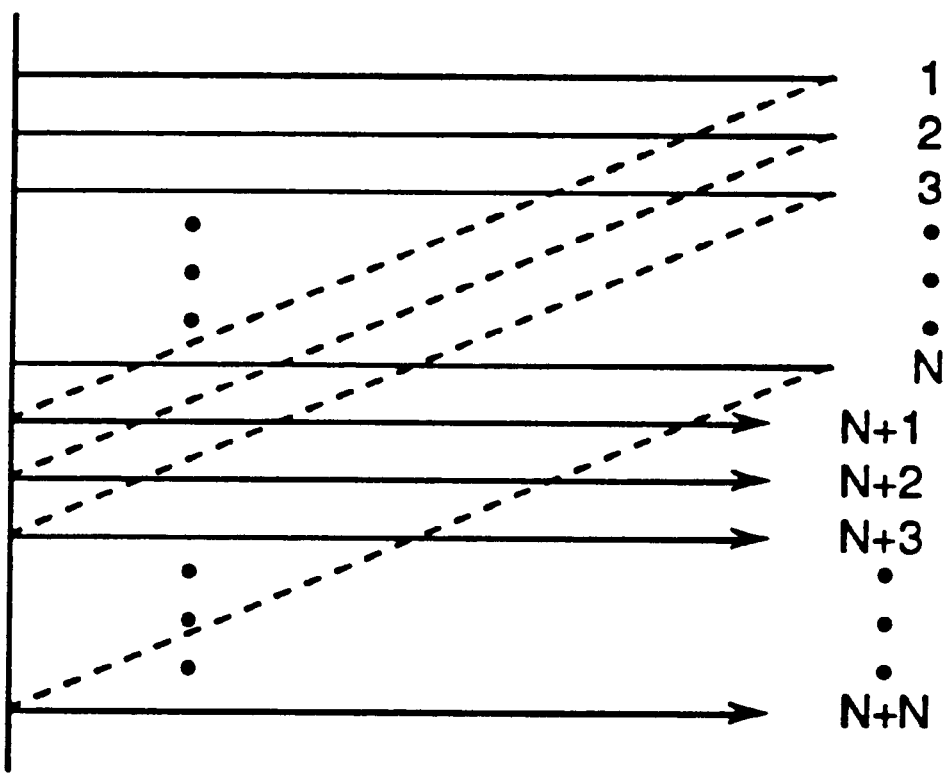
FIG. 2B illustrates the swath-by-swath raster scan of the color image projection system of the present invention.

As detailed further herein, the linear array of N parallel traveling output beamlets 102 is reflected and refracted by the optical scanning/projection system 300 to simultaneously scan a swath of N lines across the projection screen 400, and to raster M successive swath scans down the projection screen 400. Thus, in contrast to the line by line-by-line raster scan of a conventional single beam CRT as shown in FIG. 2, the color image projection system 10 simultaneously scans a swath of N lines across the projection screen 400 as illustrated in FIG. 3.

The data processing system 200 reformats an input video or graphic signal 201 (hereinafter collectively referred to as "video") into swaths, the total of which create a screen full of pixels. Each of the independently addressable sets of beamlets 110, 112 and 114 of the three primary color linear array sources 104, 106 and 108, respectively, is modulated accordingly, so that the combined N white light beamlets of the white light linear array source recreates the input picture by filling the projection screen 400 with illuminated pixels, swath-by-swath, frame-by-frame.

The data processing system 200 includes a video input converter 202 which converts common types of picture signals, such as composite video, analog RGB or computer graphics into digital Red, Green, Blue (RGB) data. Chip sets for performing such conversions are commercially available from the Signetics Division of Philips Semiconductors of Sunnyvale, Calif. as further detailed herein with reference to FIG. 8A.

In the preferred embodiment of the invention, a microprocessor-based controller 204 in conjunction with a memory 206 is employed to control the video input converter 202 via a bus 208. In this way, the decoding and formatting of the video signal are under microprocessor control. The bus 208 allows decoded timing information such as sample clock (horizontal sync) and frame reference to be passed to other portions of the color image projection system 10. In addition, the bus 208 may be utilized to transfer control information between an external computer or controller and the image projection system 10. For example, an external host computer connected to the bus 208 can be used to control the amount of hue, saturation, tint, and other composite NTSC attributes.

The video input converter 202 provides a red digital data stream 210, a green digital data stream 212 and a blue digital data stream 214. Each of the streams 110, 212 and 214 is a serial pixel stream 8-bit wide, that provides a grey scale of $2^8=256$ levels for each color data stream. Each stream has a raster format that fills a frame line-by-line. Since the color image projection system 10 fills a frame with one or more swaths of N lines, the single serial pixel stream needs to be reformatted into multiple (e.g. N) serial pixel streams, one for each of the N output beamlets of the white light linear array source 100. Stated differently, the digital data streams 210, 212 and 214 need to be converted from a single beam raster scan format as shown in FIG. 2A to an N-beamlet raster scan format as shown in FIG. 3B. Since N can be quite large, for example 64, 128 or even higher, it is preferable to multiplex the 8-bit parallel path for the grey scale pixel information for each of the N lines in the pixel stream. In the preferred embodiment of the invention, 8-bit grey scale pixel information is converted to multiplex form by a set digital processors 216, 218 and 220. For example, the serial sequential pixel stream of digital Red data 210 (8-bits wide represents all the first pixels in order from 1 to N for a swath, followed by all the second pixels of the swath, etc.) is processed by the digital processor 216 and emerges as a single multiplexed pixel stream. Similarly, the serial sequential pixel streams of digital green data 212 and blue data 214 are processed by a digital processor 218 and a digital processor 220, respectively.

The digital processors 216, 218 and 220 also serve to convert data from a selected video standard (e.g., resolution, aspect ratio) to that of the color image projection system 10 as detailed further herein, particularly with reference to FIGS. 8A through 10D. The image projection system 10, however, may be used without such data conversion when displaying an image format which matches or corresponds to the preselected image format of the image projection system 10.

A multiplexed red pixel stream 222 from the digital processor 216 is subsequently used to modulate the corresponding individually-addressable output beamlets of the red linear array source 104. Similarly, the green and blue multiplexed pixel streams 224 and 226, respectively, are used to modulate the corresponding output beamlets of the green and blue linear array sources, 106 and 108, respectively. In the preferred embodiment of the invention, such modulation is performed using a pulse-width modulator (PWM) 228, for the red component. The pulse-width modulator 228 and its advantages are described in further detail with reference to FIG. 10. Similarly, a pulse width modulator 230 operates on the green component, while a pulse width modulator 232 operates on the blue component.

After the white light linear array source 100 is modulated by a set of N-pixel streams 234, 236 and 238, the emerging linear array of N parallel-traveling modulated white light beamlets 102 is optically processed to produce, by way of the optical scanning/projection system 300, a raster scan, having one or more swaths, on the screen 400.

In one preferred embodiment of the invention, the optical scanning/projection system 300 comprises a mirror 302 which is integral to a galvanometer 304, and rotating regular polygon mirror 306 which is driven by a motor 308. The galvanometer 304 and the motor 308 are each controlled by a raster generator servo 310. The rotating regular polygon mirror 306 has as at least many facets as the number of swaths M required to generate the full picture frame. In further detail, starting from a first facet, a parallel traveling set of N beamlets 102 strike the mirror 302. The beamlets 102 are reflected by the mirror 302, reflected again by the polygon mirror 306, then refracted by a set of projection optics 312 to thereby scan a first swath across the screen 400, starting at the left top of the picture frame. This embodiment uses a 9 facet regular polygon mirror having a diameter of approximately 3 inches. This results in a polygon scan efficiency of 0.675. The vertical scan efficiency is set by the performance capability of the galvanometer and the number of inactive facets during a field cycle. Inactive facets are used to allow the galvanometer to retrace before starting a new field. A reasonable scan efficiency for a galvanometer is in the 70% (less than 80%) range. Consequently, at least 3 inactive facets are required during a scan cycle with a corresponding galvanometer scan efficiency of 0.727 (8/8+ 3)). The resulting overall scan efficiency is 0.49 (the product of 0.675 and 0.727) and the throughput efficiency of this system with a transmission of 0.60 would be less than 0.294 (the product of 0.60 and 0.49). The 9 facet/3 inch polygon system with a 72.7% vertical scan efficiency requires a spin rate of 4400 RPM to produce an 8 swath field at a 60 Hz field rate.

The net result is that a 128 element laser with a total power of 3.4 Watts per laser diode array (26.6 mW per element) will provide 3 Watts of power at the screen (the product of 3, 3.4 and 0.294).

An important feature of the invention is the use of angled facets to provide vertical rastering. Conventional projection systems typically employ a rotating regular polygon (the surface normals of all facets being perpendicular to the rotational axis) for horizontal scanning, and a second rotating mirror (usually a galvanometer) to raster the beam vertically down the screen. This adds complexity and cost to the system.

In another preferred embodiment of the optical scanning/projection system 300 as shown in FIG. 1, the galvanometer 304 with its integral mirror 302 is employed in tandem with the rotating irregular polygon mirror 306.

Figure 3A:
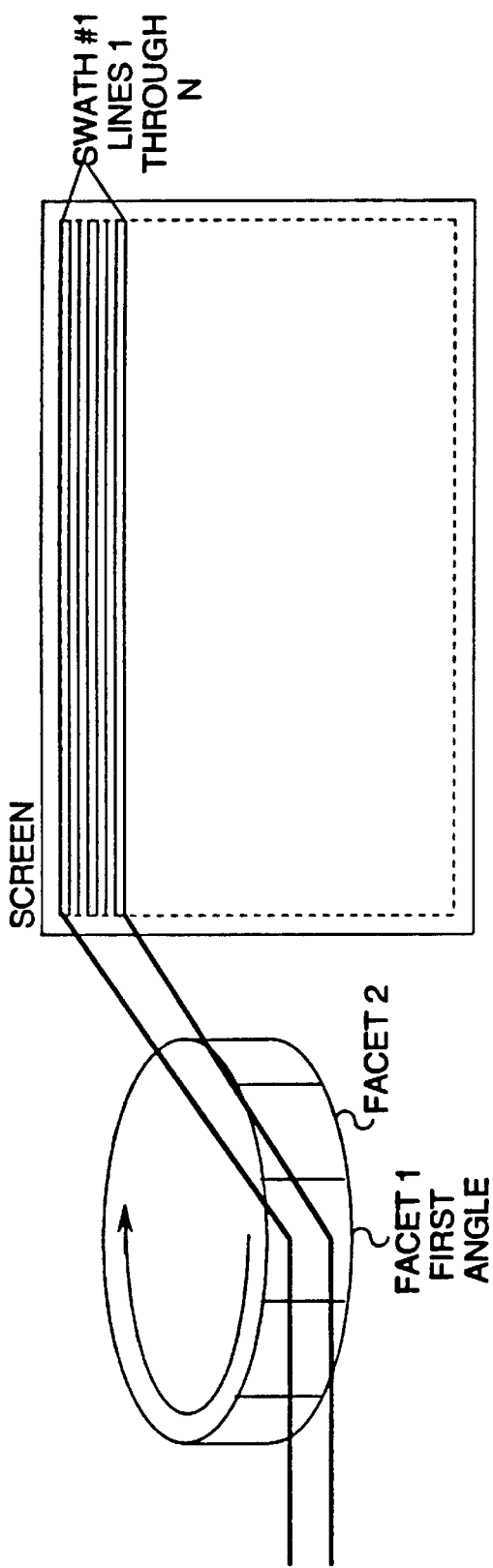
FIG. 3A is a perspective view illustrating the use of a polygon mirror having progressively tilted adjacent facets to project a first swath of N lines.
Figure 3B:
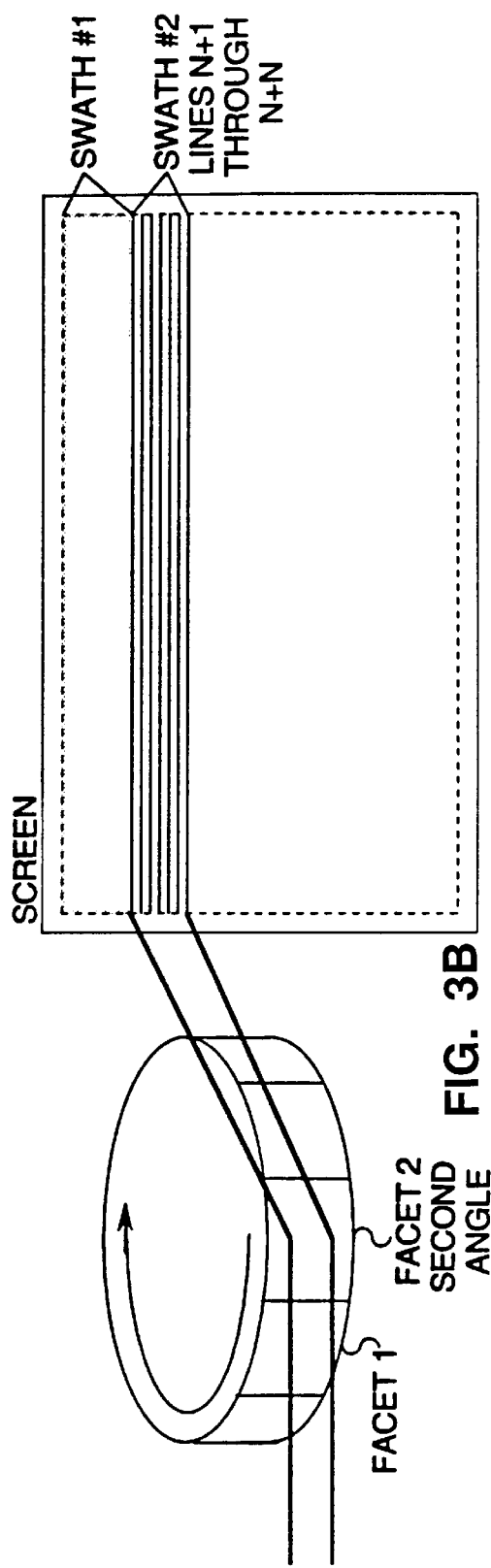
FIG. 3B is a perspective view illustrating the use of a polygon mirror having progressively tilted adjacent facets to project a second swath of N lines.

As detailed in FIGS. 3A and 3B, the surface normal to the second facet is tilted relative to the surface normal to the first facet to thereby index the second swath scan vertically down the screen, so that the bottom horizontal line of the first swath scan is contiguous with the top horizontal line of the second swath scan. The surface of each successive facet is similarly tilted with respect to the preceding facet to raster successive swath scans vertically down the screen until M swath scans are made and the whole picture frame is filled, whereupon the first facet once again begins to produce the next frame. One or more facets (in excess of the number M) may be utilized in the polygon mirror 306 to accommodate any vertical blanking interval signal included within the video signal 201.

The rotating irregular polygon mirror 306 by itself, however, will only produce M contiguous swath scans for each picture frame. The galvanometer 304 and its integral mirror 302 provide interlaced swaths to thereby display interlaced video signals. The galvanometer 304 produces a minor shift in the angle of the mirror 302 to thereby offset successive fields. For example, in a 2:1 interlace, the shift amounts to half a horizontal line spacing. In 2:1 interlaced systems, a picture frame is formed by the eye integrating "fields", where the field rate is double that of the frame rate.

In this preferred embodiment of the invention as shown in FIG. 1, an 18° scan is used to minimize the swath mismatch error generated by the pyramidal tilt of the irregular polygon mirror facets. The nominal swath mismatch error for an 8 swath 18° scan with a 1.8:1 aspect ratio is approximately ±⅕ of a line pitch. Limiting the effect of fabrication errors in the pyramidal tilt to less than ±⅕ of a line pitch requires tolerances tighter than ±3 arc seconds. The dynamic errors of polygon wobble and facet to facet timing also require accuracies of approximately ±1 arc second to be negligible contributors to raster impairment. Swath mismatch and pyramidal error contribute a peak to peak error of ±⅔ of a line pitch.

An 8 swath field requires an irregular polygon mirror with a multiple of 8 facets. The scan efficiency for an 8 facet polygon mirror with a horizontal scan of 18° and a diameter of approximately 2 inches is 0.2. To double the scan efficiency to 0.4 with a 16 facet polygon requires a diameter of approximately 6 inches. Such a diameter increase, however, increases the mass of the mirror by about fifty percent.

An important feature of the image projection system 10 of the present invention consists of the simultaneous scanning of N pixel lines of the picture frame. This method greatly reduces the angular velocity of the polygon mirror 306 required to fully illuminate a picture frame at a specified frame rate. Each polygon mirror facet is employed to scan swath-by-swath instead of line-by-line. This reduces the product of the number of facets and the angular velocity by a factor equal to the number of lines N in the swath in contrast to an N=1 system. For example, if a swath of 128 lines is scanned at a time, a10-facet polygon mirror 306 needs to be employed to produce a picture frame of 1280 horizontal lines. If desired, however, the polygon mirror 302 together with an N=1 white light source can be utilized to produce a frame having a number of lines equal to the number of successively angled reflective facets of the mirror 306 without the need for a separate vertical deflection mirror.

Video standards with different vertical scan rates or frame rates are easily accommodated by varying the angular velocity of the polygon mirror 306. This method provides a tremendous advantage over magnetically deflected systems where scan rate changes require differently configured yoke windings and compensation for the resultant changes in yoke inductance. The raster generator servo 310 obtains timing signals from the bus 208 and ensures that the mirror 306 turns and that the mirror 302 is deflected at desired rates, both in synchronization with the raster scan.

Figure 4:
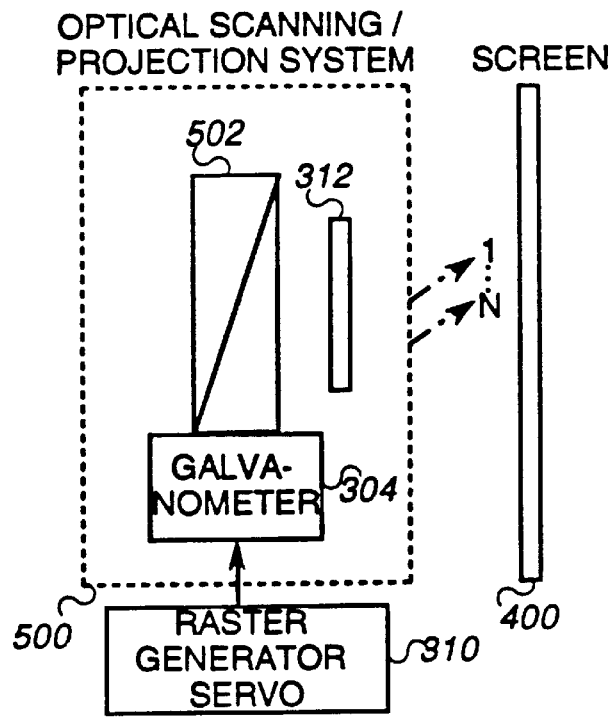
FIG. 4 is a block diagram of a first alternative embodiment of the optical scanning/projection system of FIG. 1.

Referring now to FIG. 4, a first alternative embodiment 500 of the optical scanning/projection system 300 of FIG. 1 is shown. In particular, where the total number of lines to be projected for a desired frame is equal to N, the galvanometer 304 with its integral mirror 302, simply reflects the N lines of white light to thereby scan the N lines across the screen 400. Unless required for interlacing, no vertical rastering is necessary in this embodiment. This arrangement provides a significant decrease in noise, vibration and heat which result from the motor 308 and the rotating polygon mirror 306. In addition, mismatch errors due solely to the polygon mirror 306 are eliminated.

Figure 5:
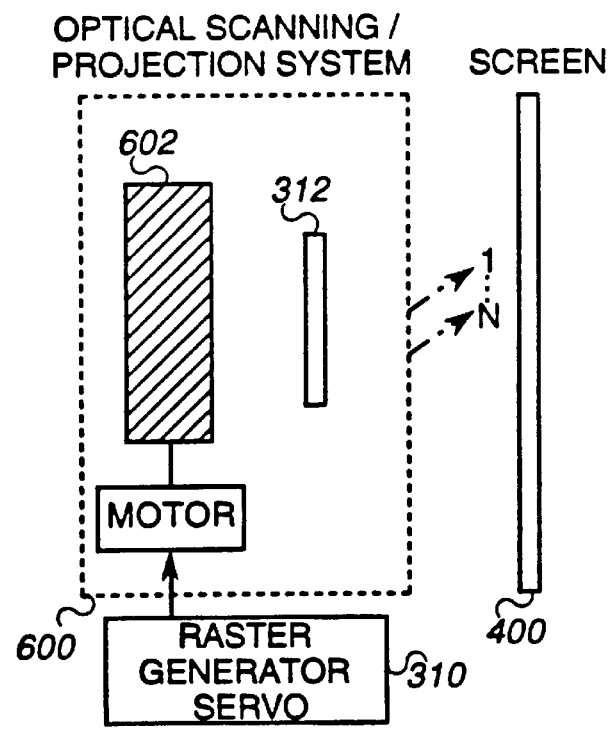
FIG. 5 is a block diagram of a second alternative embodiment of the optical scanning/projection system of FIG. 1.

Referring now to FIG. 5, a second alternative embodiment 600 of the optical scanning/projection system 300 of FIG. 1 is shown. In the second alternative embodiment 600, the polygon mirror 602 consists of a mirror where the surfaces of each of its facets are parallel to the axis of rotation of the mirror 602, in contrast to the mirror 502 utilized in FIG. 4.

In the embodiment shown in FIG. 5, where the desired number of lines to be projected as a frame is equal to N, and no interlacing is required, no vertical rastering apparatus is necessary. However, if the desired number of scan lines in a frame is less than N, then the mirror 602, in combination with a galvanometer (not shown) for vertical detection would provide the desired number of scan lines in a frame.

Thus, this third alternative embodiment would appear as that of the optical scanning/projection system 300 at FIG. 1, except that the galvanometer 304 and mirror 302 combination would be utilized to provide vertical deflection instead of merely interlacing, and the polygon mirror 306 would provide only horizontal deflection since the facets of the polygon mirror are not tilted with respect to each other. With this third alternative embodiment of the optical scanning projection system the angular velocity of the mirror 602 would be reduced by a factor of N over systems where N=1.

White light Laser Linear Array Source

FIGS. 6A, 6B and 6C illustrate in detail the red laser array 104 of FIG. 1. Except for the frequency of the light emitted from the array 104, the array 104 may be utilized as the green laser array 106 and the blue laser array 108. Mounted in alignment on a base substrate 700 are: 1) a monolithic linear array of individually-addressable stripe semiconductor laser diodes 702; 2) a linear array of micro-optical lenses 704; 3) a linear array of integrated electro-optic modulators 706; 4) a linear array of micro-optical lenses 708; 5) a linear array of nonlinear harmonic converters 710 and 6) a linear array of output beamlet collimation micro-optic lens 712. The monolithic linear array 702 includes a set of N (e.g. 64, 128, . . . ) individually-addressable, semiconductor stripe laser diodes 714. The base substrate 700 provides mechanical support and registration for the laser diodes 702, the lenses 704, the modulators 706, the lenses 708, the harmonic converters 710 and the micro-optic lens 712.

In a first preferred embodiment of the red laser array 104, the monolithic array of semiconductor stripe laser diodes 702 are grown from the AlGaInP quaternary III-V semiconductor material system to directly emit the radiation of the desired red color. In this embodiment, the modulation of the output laser beam of each stripe diode is imposed by directly modulating the drive current at each diode. The modulated radiation from each of the semiconductor stripe laser diodes of linear array 702 is then immediately collimated by the micro optic lens 712 to form the linear array of red output beamlets of the red primary color array source. In this preferred embodiment the micro optical lenses 704, modulator 706, the electro-optic micro-optic lenses 708 and the harmonic converters 710 are omitted.

In a second preferred embodiment of the red laser array 104, radiation from the linear array of AlGaInP red stripe diodes 702 is modulated upon passing through the linear array of electro-optic modulators 706, and immediately collimating the modulated linear array of output beamlets using linear lens array 712; As in the first preferred embodiment the micro-optic lenses 708 and the harmonic converters 710 are omitted.

In a third preferred embodiment of the red laser array 104, the monolithic array of semiconductor stripe laser diodes 702 is grown from the InGaAsP quaternary (or InGaAs; InGaAs ternary) III-V semiconductor material to emit light at twice the wavelengths of the desired red (green; blue) primary color, for example, at an infrared wavelength of 1300 nm for red (1040 nm for green; 960 nm for blue). In this embodiment, the modulation of the output of each stripe diode is imposed by directly modulating the diode drive current at each of the diodes 702. The modulated radiation from each of the semiconductor stripe laser diodes 702 is then immediately coupled to the linear array of stripe nonlinear harmonic converters 710 via the linear array of micro-optic coupling lenses 708. The linear arrays of stripe nonlinear harmonic converters for red, green, and blue primary color array sources comprise quasi-phased-matched waveguides grown, for example, from the $LiNbO_3$, $LiTaO_3$, KTP, $KNbO_3$ material systems. The linear array of red (green; blue) modulated output beamlets from the nonlinear converter array is then collimated by linear lens array 712.

In a fourth preferred embodiment, a variant of the third preferred embodiment, the modulation of the infrared radiation from the array of semiconductor stripe laser diodes 702 is achieved by passing it through the linear array of electro-optic modulators 706 prior to passing it through the integrated linear array of stripe nonlinear harmonic converters 710 and the linear array of output collimating lenses 712. The linear array of electro-optic modulators 706 consists of N Mach-Zehnder interferometers grown, for example, from the $LiTaO_3$, $LiNbO_3$, KTP material systems. In further detail, FIG. 6B illustrates a set of integrated electro-optic modulators 714, 716 and 718 followed by a nonlinear harmonic converter 720, 722 and 724 respectively. Although not illustrated in FIG. 6A, there is one electro-optic harmonic converter for each of laser diodes 702.

Referring now to FIG. 6C, when each of the laser diodes 702 which is modulated directly by varying the current to such diode(s), the electro-optic modulator 706 is not required. Instead, the harmonic converters 710 are utilized as illustrated in detail in FIG. 6C. In particular, these converters 710 consist of a non-integrated array.

Referring now to FIGS. 7A, 7B and 7C, one preferred embodiment of the white light linear array source 100 of FIG. 1 is illustrated in greater detail. The red, green and blue laser linear arrays 104, 106, and 108 respectively are shown, along with the optical combining mirrors 804, 806 and 808 that are mounted onto a base plate 800 that is cast from a lightweight material such as aluminum or magnesium. The base plate 800 functions as a heat sink for the laser arrays 104, 106 and 108. The base plate 800 further provides datums for registration of the arrays 104, 106 and 108 to the base plate 800. An optical combiner 802 includes the mirror 804 and the pair of dichroic mirrors 806 and 808. The optical combiner 802 combines corresponding 1-to-N collimated beamlets 110, 112 and 114 from each of the linear arrays 104, 106 and 108 into the single linear array source of N parallel-traveling, collimated white light beamlets 102. Each of the three primary color linear array sources 104, 106 and 108 is fabricated as an integrated linear array subassembly as shown in FIGS. 7A, 7B, 7C and 7C.

Referring now to FIG. 7B there is shown a front view of the white light laser array source 100 of FIG. 1. FIG. 7C illustrates the combination of a set of electro-optic modulators (of Mach-Zehnder interferometer type) 810, 812 and 814 and their associated integrated harmonic converters 816, 818 and 820 respectively.

FIG. 7C corresponds to FIG. 6B.

Referring now to FIG. 7D, an end view of the harmonic converters 710 of FIG. 6A is shown.

FIG. 7D corresponds to FIG. 6C.

Figure 8B:
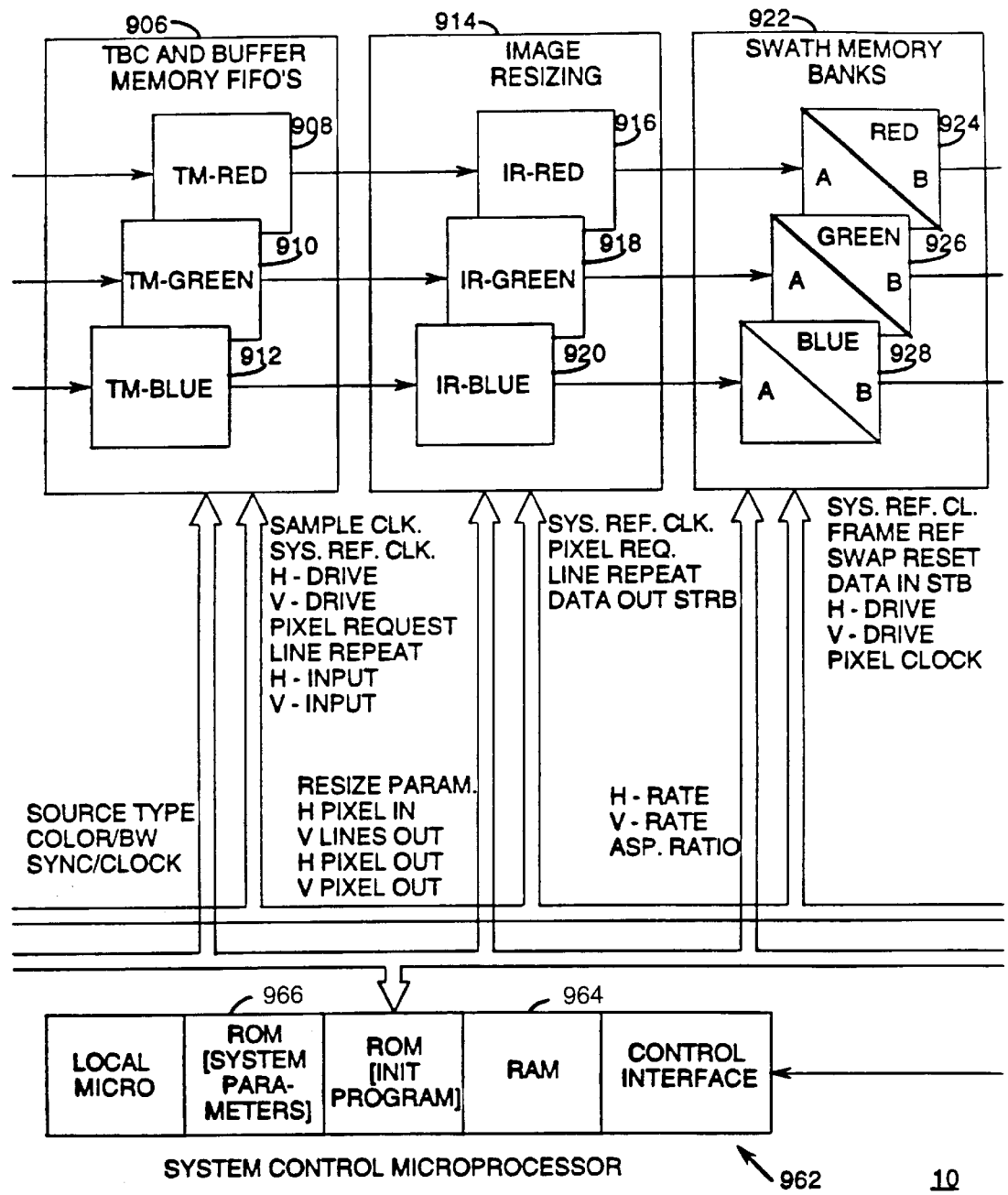
Figure 8C:
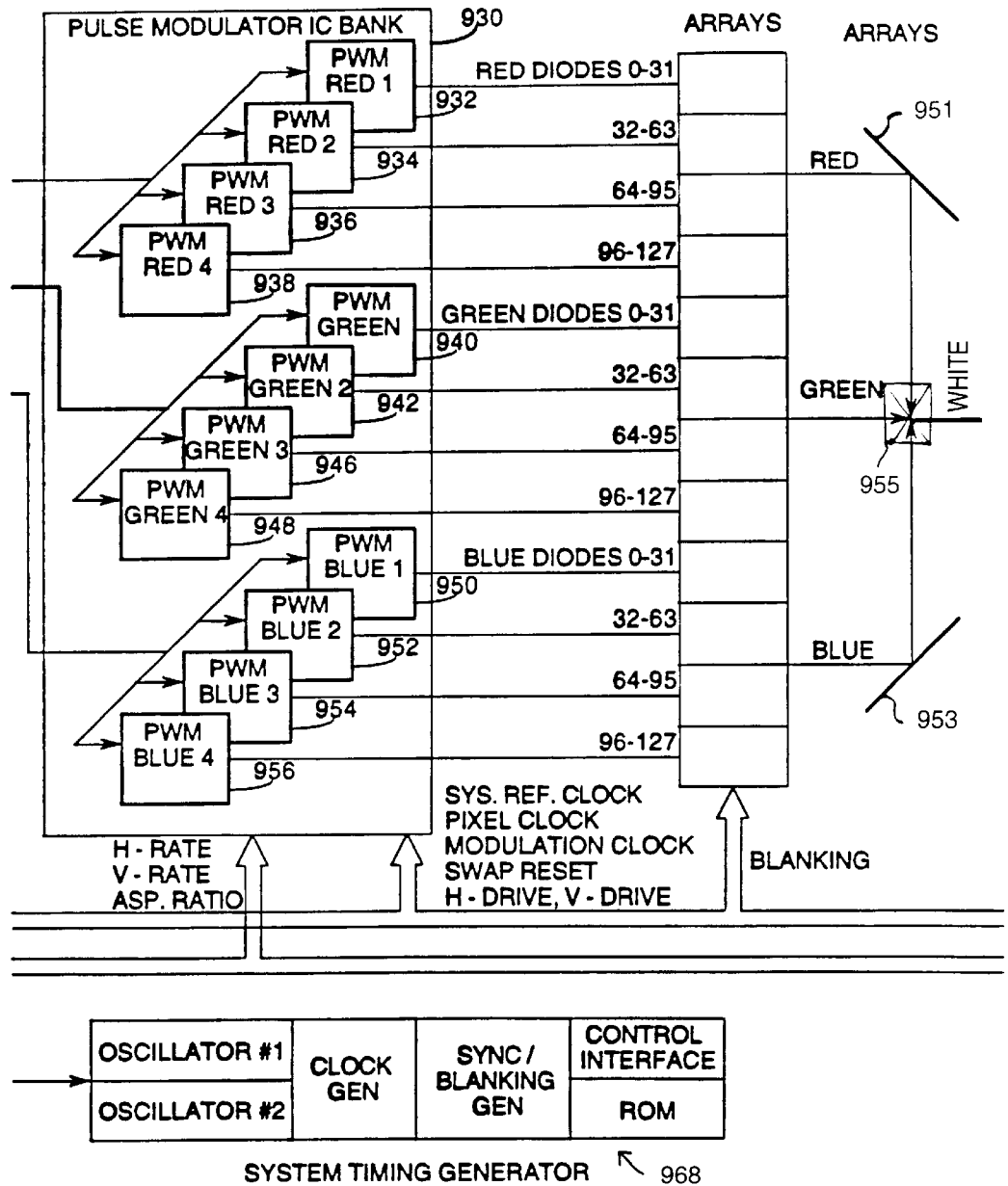

A second preferred embodiment of the white light linear array is described further herein with reference to FIG. 8C.

Data Processing System

FIGS. 8A, 8B, 8C and 8D illustrate overall data flow and basic raster generation of the data processing system 200 of FIG. 1, within the image projection system 10. The video signal 201 enters the video input converter 202, and whether the signal is standard NTSC, RGB component, or VGA computer, in all cases the signal is converted to 8-bit digital RGB video, as three separate data streams. The video input converter 202 includes an analog-to-digital converter 900, a phase lock loop 902 and a composite component decoder 904. Such video converters are well known in the art and may be constructed from commercially available chip sets. In particular a Philips Semiconductor TDA8708 analog-to-digital converter together with a Philips Semiconductor SAA 7191 luma, chroma processor/sync and clock processor and a Philips SAA 7197 clock generator circuit operate to separate a analog composite video signal into digital luminance, chrominance, horizontal and vertical signals. A TRW TMC2272 digital colorspace converter/corrector converts these digital signals and provides separate red, green and blue digital outputs. Referring now to both FIGS. 8A and 8B, the red, green and blue digital signals then pass into a memory 906 which is used for horizontal time base correction and as an input memory (only several lines needed) necessary for the resizing processor to operate in a zoom mode. The stabilized red, green and blue digital data is clocked out on demand from a set of memories 908, 910 and 912 into an image resizing processor 914 for data resolution translation to match the fixed resolution of the white light laser array source 100 and the optical scanning/projection system 300. The image resizing processor 914 contains a set of separate processors 916, 918 and 920 for the red, green and blue components respectively.

After being resized and remapped, the red, green and blue video components are inputted into a memory store 922 where re-rasterization into 128 line swaths takes place. The memory store 922 contains a set of separate swath memory banks 924, 926 and 928 for the red, green and blue video components respectively. Referring now to both FIGS. 8B and 8C, after re-rasterization groups of scan line data (swaths) are read out from the memory store 922 in a parallel multiplexed format and provided to a pulse modulator IC bank 930 to form a pulse width modulated signal which represents the intensity of the video. Each binary pulse-signal, that represents the illumination of the RGB components along a scan line, is applied to the lasers. The pulse modulator IC bank 930 includes read only memory (ROM) that stores data to convert each eight bit stream into a corresponding laser intensity. The pulse modulator IC bank 930 includes a set of four pulse width modulators 932, 934, 936 and 938 for the red video components, a set of four pulse width modulators 940, 942, 944 and 948 for the green video component and a set of four pulse width modulators 950, 952, 954 and 956 for the blue video component. Since for a given power input, each laser diode can have a different output intensity, the ROM can be modified so that each laser diode operates within a predetermined intensity range. A polygon mirror 306 and a flat mirror 302 provide horizontal and vertical deflection respectively of each swath.

Synchronization Timing Analysis

There are other standard signals that the various input modules generate and pass to the image projection system 10. They are the sampling clock, which is derived from the horizontal synchronization, and a signal called FREF, Frame Reference. This is a signal that is usually an active-low-going edge on the first pixel of active video, of the first line, of the first field. All the other synchronizing signals can be derived from this one edge, including horizontal sync, vertical sync, blanking, and chrominance field reference.

A system control bus 960 is a bi-directional computer bus interface that allows control and setup preference data to be transferred to go between a system control microprocessor 962 and the various subsystems of the image projection system 10. In particular the system control microprocessor 962 responds to an interrupt from an input device (such as an external computer), reads the corresponding input value, stores it a RAM 964, checks a ROM 966 for information regarding all the correct destinations necessary for executing the value changes correctly, and then performs a write function to all the destinations in sequence.

A system timing generator 968 generates all synchronization signals needed by the image projection system 10 for data exchange, video data synchronization between all subsystems, phase lock, encoding and decoding of multiplexed signals, and direct modulation sub-pixel high speed clock references.

System Control Bus

In further detail, the system control bus 960 is a bi-directional computer bus interface. Using an NTSC video signal as an example, the image projection system 10 must be able to control the amount of hue, saturation, brightness, and contrast in the same way a person usually adjusts a home CRT video monitor for preferences to have the picture to "look" right. In one embodiment of the present invention, values corresponding to specific amounts of hue, saturation, brightness and contrast could all be pre-set values that are stored in a ROM/RAM 961 allowing an operator to set-up either externally or from a front panel of the image projection system 10. Information provided from the user passes through the system over the control bus 960 to the appropriate subsystem.

In the preferred embodiment of the invention all of the subsystems of the image projection system 10 have the same feature bus interface, so any plug-in can send and receive the same type of data. Each subsystem has a unique destination address, so a user could select any subsystem as the source from a remote control or from the projector front panel. The system control bus 960 is an operating information bus that connects between all the different parts of the image projection system 10 as well as to an external host computer. In the preferred embodiment of the invention, the host computer is an IBM AT type with a serial I/O (RS-232) port.

Video Input Converter

NTSC RS-170A

With reference now to the video input converter 202, NTSC RS-170A, is broadcast to U.S. households or output from VHS tape recorders or videodisc players. As specified in FIG. 10C, an important specification for NTSC video is that the aspect ratio is 4:3, which is not a wide screen aspect ratio. In the preferred embodiment of the invention, a NTSC interlaced video signal is digitized to a resolution of 768 pixels horizontally across a line, for high quality representation, and between 480 and 484 active vertical lines. The chrominance signal is encoded separately from the luminance signal and is lower in resolution. Because of known artifacts in the digitized video signal, digital image enhancement which is well known in the art, may be utilized to improve picture quality for a large projected image. Alternatively, digital signals may be provided directly to the composite/component decoder 904. In such an instance, all signals with the image projection system 10 are digital.

With reference now to the video input converter 202, a typical video decoder for a broadcast NTSC signal has an input which accepts a composite signal that contains color and luminance information encoded together with a sync signal. Prior to decoding, the sync signal is first stripped off of the composite analog signal. The horizontal sync signal is used to synthesize a sampling clock, as the reference pulse for the phase lock loop 902 as it occurs once every horizontal line. Next the composite video signal (luma and chroma) is digitized by the analog-to-digital converter 900 and the chroma-luminance separation is performed digitally by the composite/component decoder 904. Decoding digitally is much cleaner than analog decoders that are now used in consumer TV receivers. With the analog method, filters are used to separate the chrominance components from the composite signal. Such analog filters introduce distortion and reduce overall signal bandwidth. Luminance and chrominance samples decoded from the composite digital signal are applied to a digital matrix (such as the TRW TMC2272 Digital Colorspace Converter Corrector) to obtain a RGB color space signal. The video passes through the image projection system 10 in RGB format.

In the preferred embodiment of the invention, a NTSC analog composite video signal is provided to the video input converter 202, and image data is supplied by the output of the video input converter 202 to the subsystems of the image projection system 10 in RGB color space. RGB is an equal luminance-chrominance-resolution format, meaning that luminance changes and color changes can both occur at the same rate in terms of bandwidth. A NTSC analog composite signal has luminance (Y) and color difference signals (U and V), however, NTSC is not an equal resolution format. The luminance (Y) typically has 4 MHz resolution, the color difference signals (U, V) usually have 1.5 and about 0.5 MHz resolution respectively. Thus, NTSC saves bandwidth by carrying less color information. Video in the form of graphics and high resolution text, however, is all equal resolution. Within the video input connector 202 the luma- and color-difference signals are converted to RGB, in order to more easily display equal resolution video sources.

1050/29.9 and HDTV 1125/30

With reference now to FIGS. 8A–8D, 10A and 10B, a second preferred embodiment of the video input converter 202 is described. The second preferred embodiment of the video input converter 202 is configured to process HDTV video signals, such as the 1050 2:1 NBC proposed standard detailed in FIG. 10B and the 1125 SMPTE 240M standard detailed in FIG. 10A. Video signals conforming to either of these standards are already RGB form, usually on three separate cables. Thus, the analog-to-digital converter 900 includes three separate analog-to-digital converters. By utilizing separate analog-to-digital converters, cross-contamination is minimized. This results in three paths, 8 bits each of R, G, and B. The sync and clock signals are generated for all standards in the same way as for NTSC signals.

Usually the HDTV standards signals carry H and V separately, sometimes composite, and often on a separate wire. The HDTV standard of FIG. 10A utilizes a "tri-level sync." Although difficult to detect, and vulnerable to noise, it is a bi-level type of standard that under normal conditions is easily decoded as is well known in the art.

In contrast to the first preferred embodiment of the video input converter 202, the second preferred embodiment (for HDTV) is actually simpler since the components are in a separate form and the analog-to-digital converters simply need to run at a higher clock rate. The phase lock loop 902 insures that the sampling clock runs at a higher clock rate.

A third preferred embodiment of the video input converter 202 is configured to process VGA computer graphics signals. VGA graphics information is typically stored in the RAM on a display card within a computer a look-up table mode. This means that between 8 and 16 bits, up to 24 bits on a digital signal bus (within the computer) is used as an address of a location in a RAM. The address in the RAM is programmed with any one of millions of color possibilities, but only some limited number available at one time. This type of scheme is used in graphics to allow any set of color palettes.

Given the limited number of color possibilities available within a particular color palette, the colors loaded into memory must be carefully selected to avoid an unnatural looking display. Using analog VGA as input to the video converter 202 would require redigitizing a previously digital signal (data) resulting in degradation from the original digital signal. Therefore, in this third preferred embodiment of the video input converter 202, the bit stream from a VGA feature bus connector of the computer is used as a clean source. Using this signal as the address of a look-up table, which would be the inverse of the color table data normally found on the VGA card, provides RGB directly in digital form, and is compatible with the RGB format utilized by the image projection system 10.

In further detail, the look-up table is loaded with the same values as in the VGA card within the computer. The VGA feature bus connector and the computer's serial interface connector is used with a software interface routine to download the color table data from the computer into the image projection system 10. In the preferred embodiment of the invention, a standard cable with a pair of D9 type connectors for serial output links to an AT type computer with a VGA interface card in the image projection system 10. This yields identical colors on both a display connected to a computer and on the screen 400 of the image projection system 10. Clock, horizontal and vertical drive (sync) signals originate directly in digital form on the VGA feature connector. These signals are utilized to generate the input clock signal and FREF.

Time Base Corrector Memory

The preferred embodiment of the invention utilizes time base correction in order to more accurately display video signals originating from video tape or other video sources. The time base of such signals is altered by their particular reproduction system because their reproduced video signals have jitter generated as the tape moves across the head and because of minor variations in tape speed. Furthermore, because tape heads are not perfectly round, there is uneven stretch in the tape thereby causing minor shifts in each horizontal line. And even during a single line there are variations in tape speed sufficiently great to adversely affect the chroma and luma characteristics of the video signal. In home TV receivers, the deflection is designed to overscan the video raster larger than the size of the tube. As a consequence, the user never actually sees the ragged edge of the video. Some part of it is actually hidden off the screen by the plastic bezel plate placed over the screen. If there is a minor shift in horizontal lines, the ragged edge is hidden. This shift degrades the overall image, vertical resolution and causes improper color signal decoding. However, most television viewers remain oblivious to such fidelity problems.

With a projector displaying a large image, however, such minor shifts in horizontal lines are more noticeable. For example, in order to show an entire image on a huge rectangular screen, the raster cannot be overscanned. Instead, the image is horizontally re-aligned. Modern TV's use what is known as a "fast horizontal AFC" typically 0.5 millisecond (as compared with 5–7 milliseconds found in older sets). Using a small time constant in a horizontal oscillator phase lock loop allows the scanning system to 'instantaneously' correct for minor changes in horizontal timing so that the ragged edges are partially corrected. However, such a technique is not useful with an electromechanical scanning system (as opposed to electromagnetic) since an electromechanical scanning system has a significant mass which is difficult to vary to make such corrections.

A similar process of disturbing the time base is often used as a copy guard protection method to protect against unauthorized home VCR recording. The headwheel in the VCR is much like the scanning polygon mirror. Video recordings that contain copy guard protection are often pre-distorted with a small amount of horizontal and vertical jitter so that a TV receiver sync scanning circuit can fast track the error, but a VCR's headwheel cannot. Thus, a video time base corrector is utilized for the preferred embodiment of the present invention.

With reference now to FIG. 8B, the time base corrector and buffer memory 906 is described in further detail. The time base corrector and buffer memory 906 sample a few scan lines and read them into memory with control information. Digital logic contained in the time base corrector and buffer memory 906 determines that the horizontal sync has deviated from a standard synthesized internal horizontal sync, and in response the time base corrector section re-shifts the lines by some minute a mount so that they will all line up again. The lines are then read out of the buffer memory section in perfect synchronism for display as a perfect raster.

Image Resizing

The image projection system 10 of the present invention displays a variety of image formats. This places a tremendous burden on the scanning electronics because there are different numbers of pixels per lines and different numbers of lines, different blanking times between retrace. To display all raster formats with the restrictions imposed by a predetermined number of laser light sources is impractical. Turning off different combinations of laser light sources to obtain a fully lit raster causes uneven line spacing. There will always be some multiples of frequencies and/or scan lines that an optical scanning system cannot accommodate.

In order to overcome this problem, the image projection system of the present invention uses the image resizing processor 916 to convert different numbers of pixels per line and different numbers of scan lines and convert them into one common resolution. As graphically illustrated in FIG. 9, with this method, it becomes possible to optimize the image projection system 10 for a predetermined image size. In addition, the conversion method utilized in the present invention corrects for images existing in different aspect ratios. If an optical scanning projection system is configured to produce a specific aspect ratio, for video usually between 16:9 and 4:3, it is necessary for some additional horizontal shrinking and zooming, depending on which operation is necessary to correct the aspect ratio raster.

In further detail, the image resizing processor 914 performs two image resolution transformations, one for resolution matching and one for aspect correction.

The image resizing processor 914 receives image input at any number of pixels per line and any number of lines and performs an interpolation function in the digital domain to thereby yield more or fewer pixels per line and more or less lines per frame. The image input is converted to a common format for the scanning/display generation for a fixed number of lasers in the array and a mirror with a fixed number of facets. In the preferred embodiment of the invention, the image resizing processor 914 converts all inputs to a common format of 1280 pixels by 1280 lines which is based upon 128 laser diodes in each laser array.

In the preferred embodiment of the invention, the image resizing processor 914 performs fractional re-scaling, horizontal and/or vertical, independently done in either dimension, horizontally and vertically. Any image signal can be matched to the fixed 1280×1280 format. In operation, complex interpolation and variable bandwidth filter algorithms perform resizing of image data in real time at high speed.

The image resizing processor 914 accepts control from the system control bus 960, the same bus described with respect to the video input converter 202 and image projection system 10. The image resizing processor 914 loads line and pixel parameters, based upon required resizing factors obtained from an internal table that contains values corresponding to each of the various standards. This results in the correct aspect ratio as well as the correct number of lines and pixels per line. Image resizing techniques that are suitable for use in connection with the preferred embodiment of the invention are disclosed in the paper entitled "Video Resizing—how to make bigger/smaller image the best it can be!" by James H. Arbeiter, Proceedings, Electronic Imaging International, Sep. 29–Oct. 2, 1992, Hynes Convention Center, Boston, Mass., which paper is incorporated herein by reference.

There are a variety of vertical frequencies for video signals. There is 59.9 Hz for NTSC and the proposed 1050 HD standard; there is 1125/60—which is actually 1125/30 because it is a 30 Hz frame rate—and there is VGA computer graphics, that can vary vertically between 40 and 70 Hz.

For the image projection system 10 to accommodate various vertical scan rates, the polygon motor is rotated at different speeds, and the flat mirror is deflected so that it provides vertical deflection at the same rate as that of the input video signal. Whatever image signal is displayed, the scanning optics remain the same, because it is always the same amount of data, input re-sized to fixed scanning resolution, the difference is in data rate only. A different vertical scanning rate relates to scanning out the whole field or frame faster or slower. This concept can be thought of as the same raster going on the screen, it is just scanned out a little faster or slower, based on the vertical rate, which is the field or frame update rate.

The image resizing process coupled with the variable speeds of the polygon drive motor and the vertical deflection galvanometer and its associated control electronics 310 provides a method to handle any image format that is input to the image projection system 10. All the necessary parameters can be pre-coded into ROM tables in order to unburden the system from having to perform the computations necessary to obtain them.

Swath Memory Banks

In the preferred embodiment of the invention, sufficient brightness is obtained by scanning many lines in parallel.

Since all current video standards are in CRT raster format, meaning a single data stream for a single beam which scans back and forth, the present invention includes a method of converting from a single beam input format to a raster scanning of multiple laser beams scanning out simultaneously.

In accordance with the present invention, all of the lines needed for the parallel scan are stored in the memories 924, 926 and 928 and read out to produce parallel scanned lines. The first pixel for all the lines is read from the memory first and then the second pixel for all lines and so on at 1/N speed, where N=number of parallel lines. All the laser diodes are active at the same time. One preferred method for performing the function is to use two memories. A first memory stores a group of N lines while a second memory outputs a group of N lines in parallel. Then they "ping-pong" back and forth. Video is read into either memory, the addresses sequentially incremented, and at the output the video is read out in a line-parallel fashion.

It is almost impractical to use 128 8-bit paths going out of the memory. A method for alleviating this problem would be to read out from the memory in a different order, meaning read out the N pixels for the N lines, then N pixels of N+1 lines. This is called a multiplexed format where data appears sequentially on a single wire and the order of the sequence is known and decoded at the destination. Since the data goes out N times as slowly, N pixels can be read out in the same amount of time and then each one shown them as the first pixel on all parallel sources. The data rate going into either memory is the same as the data rate going out. If we had different data rates, the memory would either overflow or become exhausted.

Pulse Width Modulators

In the preferred embodiment of the invention, the image projection system 10 uses 128 lines scanned out in parallel. With three (R, G, B) diodes per pixel, this results in a total of 384 active video channels. These channels originate as 384 equivalent (multiplexed) data streams from scan-converting frame stores 924, 926 and 928. In the preferred embodiment of the invention, each channel uses 8-bit equivalent resolution. Each such digital signal is converted to an analog signal in order to drive the laser diodes to reproduce the time varying pixel amplitude (and color) for each of the 128 scan lines. 384 digital-to-analog converters in any system is an extremely large number of devices, requiring large PC board real estate, tedious calibration, and linearized driver electronics of sufficient power and bandwidth.

Figure 11:
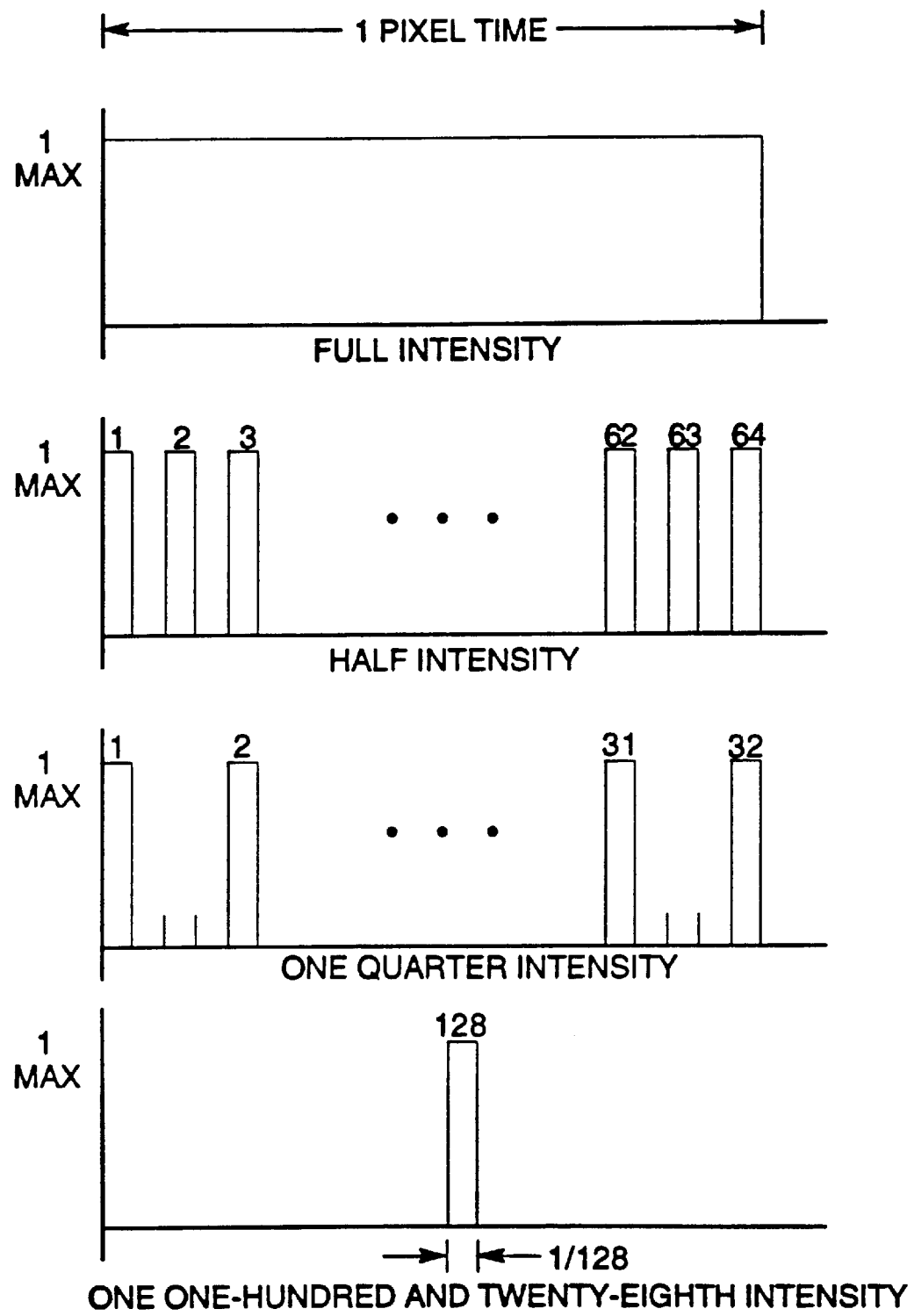
FIG. 11 is a timing diagram that illustrates a pulse-width-modulation method according to one embodiment of the present invention.

The preferred embodiment of the present invention uses pulse-width modulation to provide a full power current source for each laser with a time varying pulse train (duty cycle), so that the average power delivered to any diode over the pixel time will correspond to light from the diode at specific intensity. As illustrated in FIG. 11, this would be the same exact amplitude that the D/A converter would produce for a given 8-bit value, that in fact is the R, G, B intensities form video for a given pixel. This is advantageous for several reasons. switch-mode electronics eliminates the need for D/A converters, highly filtered power supplies, linearized driver electronics, and costly setup and calibration. Switch-mode logic uses less power than its analog counterpart, since there is little power dissipated in output transistors themselves as they are either fully on or fully off. Although specific examples of pulses for generating specified intensity levels are illustrated in FIG. 11, different numbers, timing and amplitude of each of the pulses may be utilized to deliver a predetermined amount of energy to each laser diode over a predetermined period to thereby establish the (perceived) intensity of the output of such laser diode. Alternatively, such pulses can drive Mach-Zehnder interferometer modulators to control the intensity of each beam.

Switch-mode pulse code modulation (PCM) is normally not applied to digital video systems. The reason is that for 8-bit resolution (256 levels of intensity) and 4 MHz video bandwidth, the switching rate would have to be extremely fast. For example, if a pixel needed to be minimum intensity, or $\frac{1}{256}$ as bright as full intensity (256 levels), and if response were linear, a reasonable assumption might be that a pulse that was full on for $\frac{1}{256}$ of the overall pixel time would be needed. That would require a clock 256 times as fast as the pixel clock used for digitizing the input video data stream. Most drivers could not switch sufficiently fast for this application and would become slow-rate limited. In addition, the digital logic to generate such fast pulse trains does not exist in any off-the-shelf or cost effective form.

However, the image projection system 10 of the present invention scans out swathes of line-slowed-down video. In the case of 128 swathes, the line time is 128 times longer. The switch rate drops by almost a factor of 128, that is within the normal operating range for CMOS type IC logic. This range is very reasonable for operation of a switch-mode driver. For pulse width modulation, the amount of light energy resulting from the duration of some number of pulses is proportional to the amplitudes of each video sample (pixel).

In order to achieve performance acceptable to most viewers it is necessary to have more than enough on-off cycles during one pixel time to produce the minimum of intensity values for good quality image reproduction. Because the image projection system 10 has such a large display and excellent beam/optics, and the human eye is extremely sensitive to grey level resolution, and in the preferred embodiment of the invention, 256 grey levels are utilized instead of the 128 levels illustrated in FIG. 11. The modulation used will at any sampling instant to produce a specific pulse duration, based on an 8-bit intensity code, to generate the amplitude value of the baseband signal. For any analog signal the pulse width modulation (PWM) varies linearly between the two extremes of non-intensity to full-intensity. The widest cumulative pulse time represents the maximum energy delivered and the narrowest cumulative pulse time represents the minimum energy, or minimum intensity.

The duration of the pulse varies as a function of the amplitude of the image signal. The eye has the ability to integrate modulated light pulses into an averaged perceived value. However, it may be desirable to use an integrator to smooth the sharp step, inherent in switched outputs, to produce a more average value. Alternatively, using a finer pulse step increment may eliminate the need for a post filter. This scheme requires fewer components than analog integrators. Also, pulse modulation schemes can scale over wide frequency ranges, whereas the analog components are generally specified for only one sample frequency.

Using this pulse modulation method simplifies the amount of analog electronics and wired interconnects in the image projection system 10. In addition, many PCM units could be placed on a single IC device (typically 32 modules).

In the embodiment shown in FIG. 8C, outputs from the red laser array 104, the green laser array 106 and the blue laser array 108 are combined using different combining optics than in the embodiment shown in FIGS. 7A–7D. In particular, parallel beams of primary color are reflected by a mirror 951, parallel beams of a second primary color are reflected by a mirror 953, and parallel beams of a third primary color are directed to a combining cube 955 that operates to combine corresponding parallel beams of each primary color.

Raster Generation and Servo

Horizontal Deflection

Figure 8D:
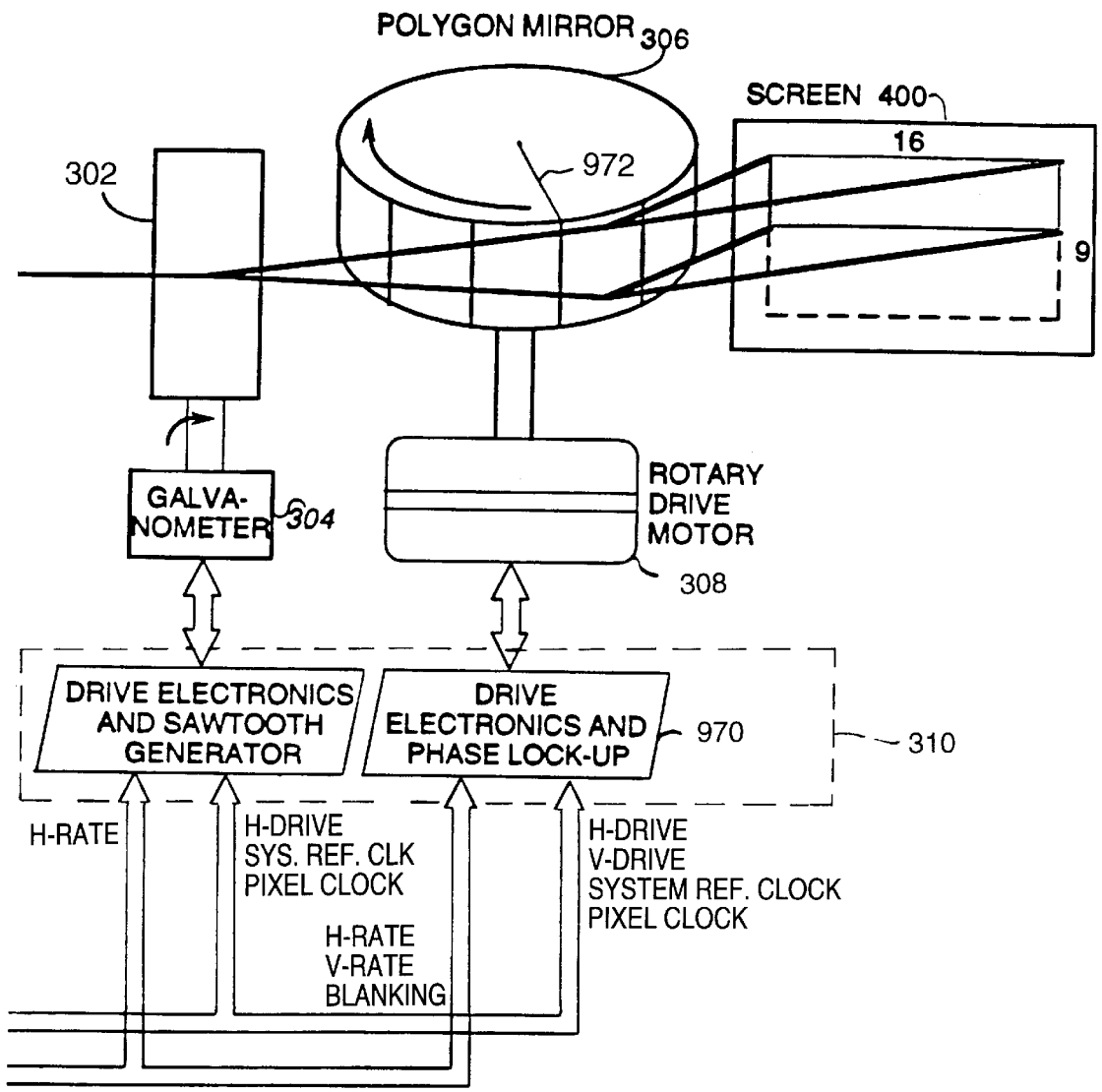
Figure 9:
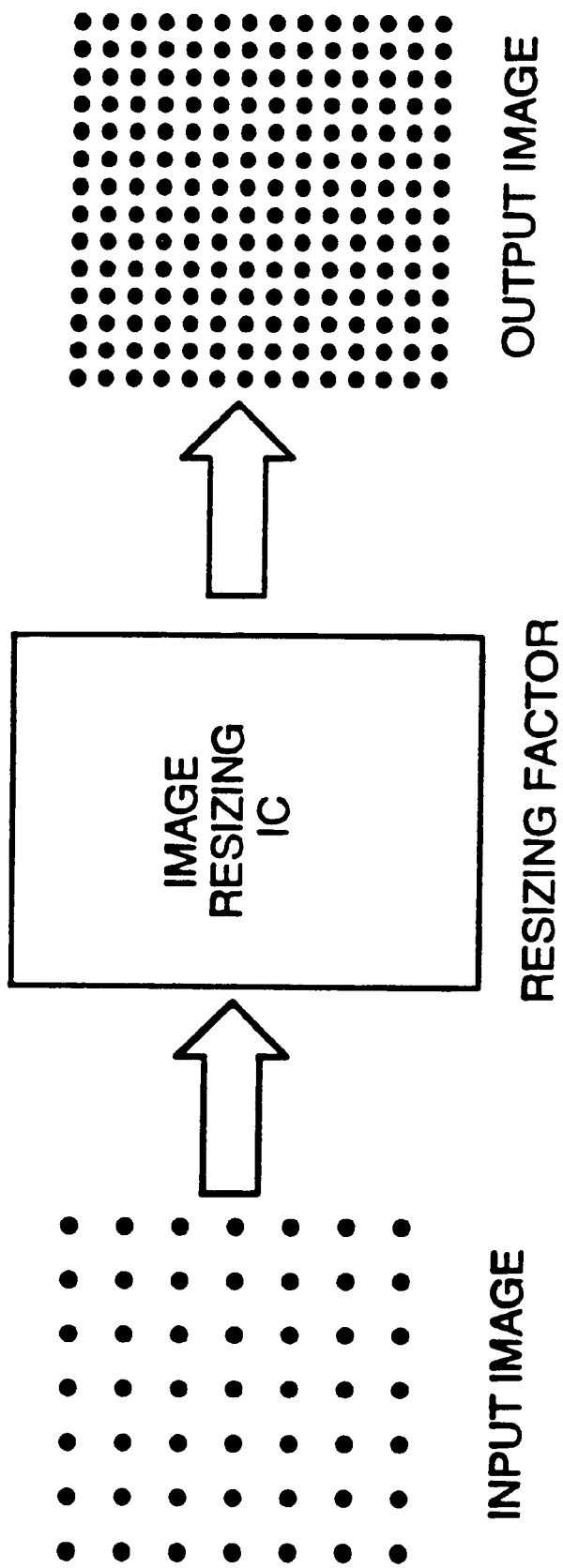
FIG. 9 is a diagram that illustrates a picture frame being mapped by the image resizing module to another picture frame with the same aspect ratio but with a higher resolution.

In the preferred embodiment of the invention, the horizontal deflection of the laser swath is provided by the rotating polygon mirror 306. The drive motor 308 is locked to the incoming horizontal drive signal which is synchronized with the start of each swath (horizontal line group) read out under control of the swath memory banks 922. Optical feedback for a control system is provided by a line 972 scribed on the top of the polygon mirror 306 which aligns with the facet edge. Each facet is used to deflect one swath. Thus, the polygon facet edge signal derived from the scribed line and the incoming horizontal drive serve as inputs to the motor servo phase locked loop 970. Although FIG. 8D illustrates a polygon mirror 306 having a total of nine facets, since the polygon mirror only provides horizontal deflection, the number of facets is not critical to the design of the system. In particular, if it takes eight swaths to make a complete 1024 line raster, correspondingly it takes eight facets to make one frame. The vertical blanking time (time for the interlace galvanometer to reset) is accommodated by skipping an integer number of facets.

Vertical Deflection

In the preferred embodiment of the invention, vertical deflection is provided by a galvanometer 304 having an integral mirror 304. The mirror 304 moves in a continuous and linear fashion during each active frame time. Since the mirror 304 cannot move instantaneously or in discrete steps, it therefore moves during the entire active swath time. At the end of a swath and after horizontal blanking, the amount of vertical deflection is precisely enough so that line one of swath number two begins underneath the line 128 of swath number one. This causes the raster to tilt by an amount of one swath's height, or 128 scan lines. This tilt is removed optically before the raster is projected on the screen. The amount of time needed for vertical retrace is estimated to be between ten and thirty percent of the total frame time. The sync blanking time of the input video and graphics sources will vary depending on the display standard which they conform to. In any system with a rotating polygon mirror 306 there will always be some discrete number of facets to skip over one frame time and therefore a sync blanking ratio can be established. If the frame time is the same for the input video as it is the scanned out image, then the data can be read out from the frame store slightly slower or faster to meet the integer criteria. As previously described with respect to FIGS. 1, 4 and 5, a galvanometer may be used to provide the capability to display interlaced formats.

Optical Scanning/Projection System

Figure 12:
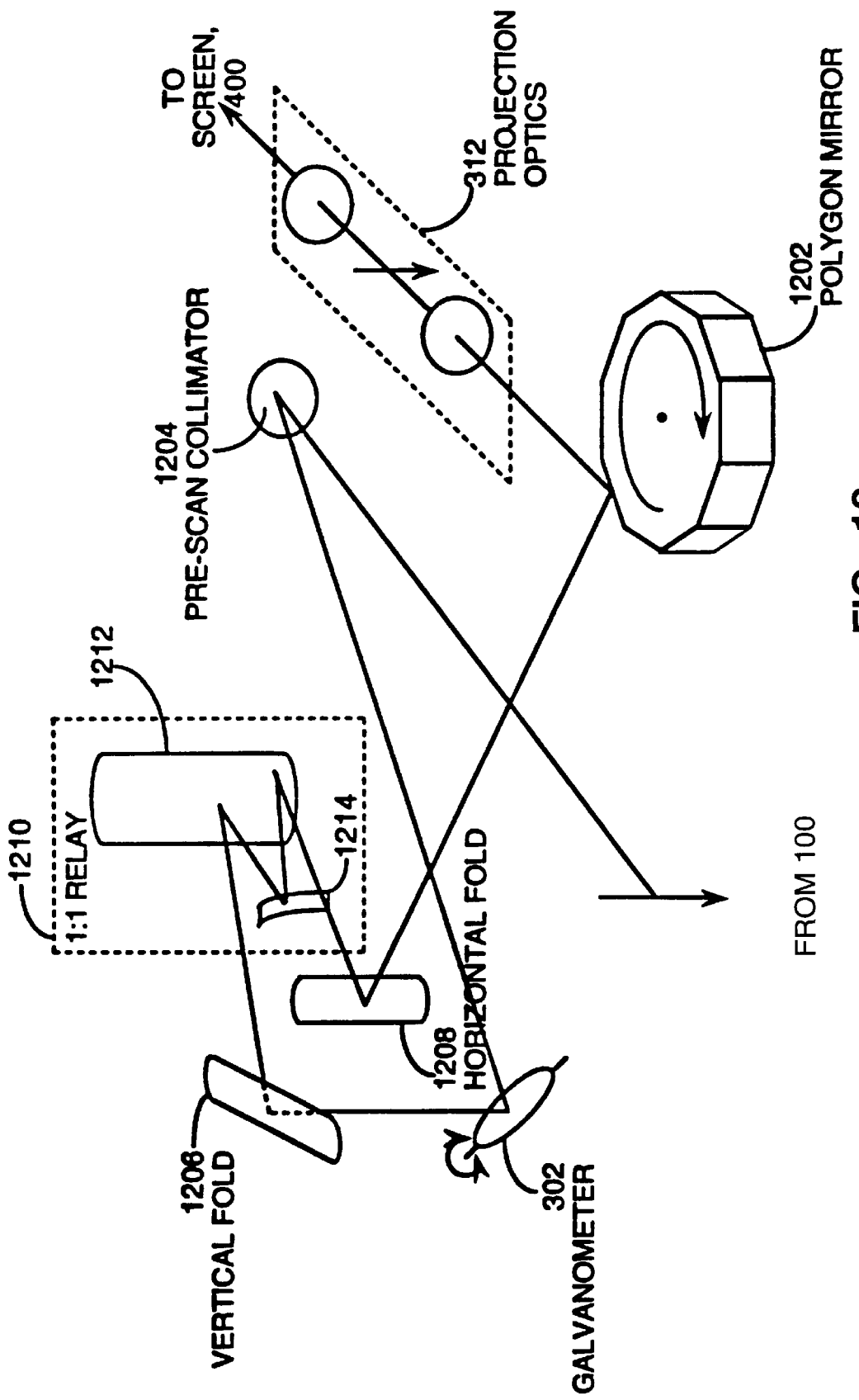
FIG. 12 is a perspective schematic layout that illustrates in further detail one embodiment of the optical scanning/projection system of FIG. 1.

FIG. 12 illustrates a schematic layout of one embodiment 1200 of the optical scanning/projection system 300 of FIG. 1. This embodiment 1200 utilizes a conventional rotating polygon mirror 1202 and the galvanometer deflector mirror 302 to raster successive swath scans vertically down the screen. An appropriate prescan collimator 1204, a vertical fold mirror 1206, a horizontal fold mirror 1208 and a 1:1 relay system 1210 are utilized to image the output of the white light laser array source 100 of FIG. 1 at the facets of the rotating polygon mirror 1202. The projection optics 312 relay this image to the projection screen 400. In the preferred embodiment of the invention, the prescan collimator 1204 is a spherical mirror. The 1:1 relay 1210 consist of a first concentric spherical mirror 1212 and a second spherical mirror 1214, both mirrors being nearly concentric. The mirrors 1212 and 1214 are designed to operate within a finite telocentric field. The functions of the relay 1210 have been inverted to thereby image the collimated field from pupil to pupil with unity magnification.

Figure 13:
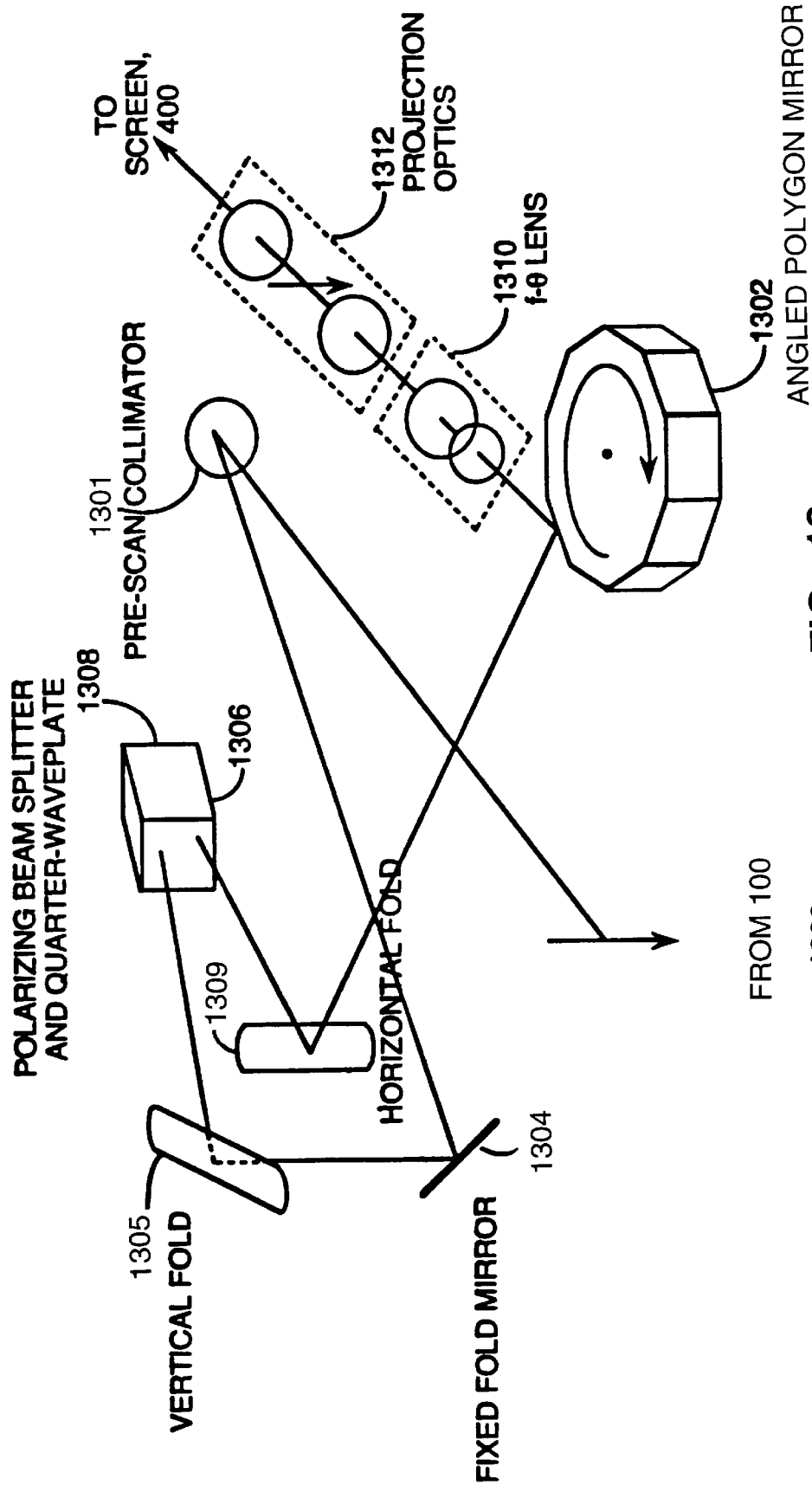
FIG. 13 is a perspective schematic layout that illustrates in further detail a second embodiment of the optical scanning projection system of FIG. 1.

Referring now to FIG. 13, another embodiment 1300 of the optical scanning/projection system 300 of FIG. 1 is shown. This embodiment 1300 differs from the embodiment 1200 of FIG. 12 in that the rotating right polygon mirror 1202 of FIG. 12 is replaced with a tilted facet rotating polygon mirror 1302 and the galvanometer mirror 302 is replaced with a fixed fold mirror 1304. In this embodiment 1300, the successively angled surfaces of the rotating polygon 1302 control the successive swath scans of the output from the white light laser array source 100 of FIG. 1. Because of the successively angled surfaces of the rotating polygon mirror 1302, the successive swaths are vertically rastered down the screen 400 thereby eliminating the need for a galvanometer mirror 302 and its integral galvanometer 304 as shown in FIG. 1.

In FIG. 13 collimated output from the white light laser array source 100 is directed to the polygon mirror 1302 via a pre-scan collimator 1301, the fixed fold mirror 1304, a vertical fold mirror 1305, a polarizing beamsplitter 1306 (used in reflection) a quarter waveplate 1308 and a horizontal fold mirror 1309. The angled polygon 1302 scans 10 swaths of a 128 line array to thereby provide a 1280 line field. This scan field is split from the input to the polygon mirror 1302 by passing through quarter waveplate 1308 a second time (to complete a 90° rotation of the polarization) and transmitted through the polarizing beam splitter 1306. An F-theta scan lens 1310 creates an intermediate image that is displayed onto the screen 400 by a projection lens 1312. The geometry of the angled polygon mirror 1302 must be selected to balance two competing raster errors. The optical scan angle produced by one facet must be sufficiently small to minimize swath mismatch, but sufficiently large to minimize the raster cross-scan displacement caused by facet pyramidal angle error plus the effects of wobble of the angled polygon mirror.

While the embodiments of the various aspects of the present invention that have been described are the preferred implementation, those skilled in the art will understand that variations thereof may also be possible. Therefore, the invention is entitled to protection within the full scope of the appended claims.

We claim:

1. An image projection apparatus, comprising:

a plurality of primary wavelength light sources for generating a plurality of parallel traveling light beamlets, each primary wavelength light source including a linear array of semiconductor laser diodes for generating parallel traveling light beamlets, all of the semiconductor laser diodes of such linear array operative to emit light beamlets having a substantially same wavelength, the substantially same wavelength being different from that of light beamlets emitted by a linear array of another of the plurality of primary wavelength light sources, the plurality of primary wavelength light sources including at least one non-linear harmonic converter for multiplying a frequency of light beamlets generated by the linear array of semiconductor laser diodes of at least one primary wavelength light source;

means for modulating each parallel traveling light beamlet; and means for scanning and projecting the modulated parallel traveling light beamlets to generate pixels onto an image receptor.

2. An image projection apparatus, comprising:

converter means for outputting a red digital signal, a green digital signal and a blue digital signal in response to a video signal representative of a color image;

time base correction means for correcting timing errors of the red, green and blue digital signals;

serial to parallel conversion means for generating sets of parallel data representative of the color image;

a plurality of primary wavelength light beamlet sources for generating a plurality of parallel traveling beamlets;

modulation means for modulating the plurality of the parallel traveling beamlets in response to the parallel data, the modulation means including at least one Mach-Zehnder interferometer per beamlet; and means for scanning and projecting the modulated parallel traveling beamlets.

3. An image projection apparatus, comprising:

a plurality of primary wavelength light sources for generating a plurality of parallel traveling light beamlets, each primary wavelength light source including a linear array of semiconductor laser diodes, all of the semiconductor laser diodes of such linear array operative to emit light beamlets having a substantially same wavelength, the substantially same wavelength being different from that of light beamlets emitted by a linear array of another of the Plurality of Primary wavelength light sources;

means for modulating each parallel traveling light beamlet; and means for scanning and projecting the modulated parallel traveling light beamlets to generate pixels onto an image receptor, wherein said plurality of primary wavelength light beam sources further comprises:

at least one non-linear harmonic converter for multiplying a frequency of light beamlets generated by the linear array of semiconductor laser diodes of at least one primary wavelength light source.

4. An image projection apparatus, comprising:

a plurality of primary wavelength light sources for generating a plurality of parallel traveling light beamlets, each primary wavelength light source including a linear array of semiconductor laser diodes, the semiconductor laser diodes of such linear array operative to emit light beamlets having a substantially same wavelength;

at least one Mach-Zehnder interferometer per beamlet for modulating each parallel traveling light beamlet; and means for scanning and projecting the modulated parallel traveling light beamlets to generate pixels onto an image receptor.

5. An method of projecting an image, comprising the steps of:

generating a plurality of parallel traveling light beamlets from a plurality of primary wavelength light sources, each primary wavelength light source including a linear array of semiconductor laser diodes for generating parallel traveling light beamlets, all of the semiconductor laser diodes of such linear array operative to emit light beamlets having a substantially same wavelength, the substantially same wavelength being different from that of light beamlets emitted by a linear array of another of the plurality of primary wavelength light sources, the plurality of primary wavelength light sources including at least one non-linear harmonic converter for multiplying a frequency of light beamlets generated by the linear array of semiconductor laser diodes of at least one primary wavelength light source;

modulating each parallel traveling light beamlet; and scanning and projecting the modulated parallel traveling light beamlets to generate pixels onto an image receptor.

6. A method of projecting an image, comprising the steps of:

outputting a red digital signal, a green digital signal and a blue digital signal in response to a video signal representative of a color image;

correcting timing errors of the red, green and blue digital signals;

generating sets of parallel data from serial data representative of the color image;

generating a plurality of parallel traveling beamlets from a plurality of primary wavelength light beamlet sources;

modulating with at least one Mach-Zehnder interferometer per beamlet the plurality of the parallel traveling beamlets in response to the parallel data; and scanning and projecting the modulated parallel traveling beamlets.

7. A method of projecting an image, comprising the steps of:

generating a plurality of parallel traveling light beamlets from a plurality of primary wavelength light sources, each primary wavelength light source including a linear array of semiconductor laser diodes, all of the semiconductor laser diodes of such linear array operative to emit light beamlets having a substantially same wavelength, the substantially same wavelength being different from that of light beamlets emitted by a linear array of another of the plurality of primary wavelength light sources;

modulating each parallel traveling light beamlet;

means for scanning and projecting the modulated parallel traveling light beamlets to generate pixels onto an image receptor; and multiplying with at least one non-linear harmonic converter a frequency of light beamlets generated by the linear array of semiconductor laser diodes of at least one primary wavelength light source.

8. A method of projecting an image, comprising the steps of:

generating a plurality of parallel traveling light beamlets from a plurality of primary wavelength light sources, each primary wavelength light source including a linear array of semiconductor laser diodes, the semiconductor laser diodes of such linear array operative to emit light beamlets having a substantially same wavelength;

modulating each parallel traveling light beamlet with at least one Mach-Zehnder interferometer per beamlet; and scanning and projecting the modulated parallel traveling light beamlets to generate pixels onto an image receptor.

* * * * *